United States Patent
Mitsumoto et al.

(10) Patent No.: US 9,168,953 B2
(45) Date of Patent: Oct. 27, 2015

(54) VEHICLE TRAVEL TRACK CONTROL DEVICE

(75) Inventors: Hisanori Mitsumoto, Gotenba (JP); Takahiro Kojo, Gotenba (JP); Yoji Kunihiro, Susono (JP); Toru Takashima, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/351,303

(22) PCT Filed: Nov. 8, 2011

(86) PCT No.: PCT/JP2011/075766
§ 371 (c)(1),
(2), (4) Date: Apr. 11, 2014

(87) PCT Pub. No.: WO2013/069099
PCT Pub. Date: May 16, 2013

(65) Prior Publication Data
US 2014/0257640 A1   Sep. 11, 2014

(51) Int. Cl.
*G06F 19/00* (2011.01)
*B62D 15/02* (2006.01)
*B60W 30/12* (2006.01)

(52) U.S. Cl.
CPC ............ *B62D 15/025* (2013.01); *B60W 30/12* (2013.01)

(58) Field of Classification Search
CPC ........ B62D 6/00; B62D 137/00; B62D 13/00; B62D 6/003; B60W 30/12; B60T 2201/18; B60T 2201/087; B60T 8/17557
USPC ............ 701/41, 70, 91, 28, 48; 180/168, 170
See application file for complete search history.

(56) References Cited

U.S. PATENT DOCUMENTS 7,058,494 B2 *  6/2006  Matsumoto et al. ............ 701/41
7,392,120 B2 *  6/2008  Matsumoto et al. ............ 701/41
(Continued)

FOREIGN PATENT DOCUMENTS

JP      4-283806     10/1992
JP      2001-22444    1/2001
(Continued)

OTHER PUBLICATIONS

International Search Report issued Feb. 14, 2012, in PCT/JP2011/075766, filed Nov. 8, 2011.
(Continued)

*Primary Examiner* — McDieunel Marc
(74) *Attorney, Agent, or Firm* — Oblon, McClelland, Maier & Neustadt, L.L.P.

(57) ABSTRACT

A vehicle travel track control device which includes a forward image capture device which captures an image ahead of a vehicle, and side image capture devices which capture an image on the left side and/or the right side of the vehicle. When it is possible to properly execute a travel track control on the basis of captured forward image information ahead of the vehicle, the travel track control is executed on the basis of the captured forward image information sent from the forward image capture device, and when it is not possible to properly execute a travel track control on the basis of the captured forward image information, the travel track control is executed on the basis of at least captured side image information sent from the side image capture devices.

15 Claims, 16 Drawing Sheets

(56) References Cited

U.S. PATENT DOCUMENTS

| | | | |
|---|---|---|---|
| 7,580,785 B2* | 8/2009 | Matsumoto et al. | 701/70 |
| 8,350,724 B2* | 1/2013 | Szczerba et al. | 340/932.2 |
| 8,386,114 B2* | 2/2013 | Higgins-Luthman | 701/28 |
| 8,543,277 B2* | 9/2013 | Higgins-Luthman | 701/28 |
| 2004/0153228 A1* | 8/2004 | Matsumoto et al. | 701/41 |
| 2004/0158377 A1* | 8/2004 | Matsumoto et al. | 701/48 |
| 2007/0069873 A1* | 3/2007 | Kudo | 340/435 |
| 2008/0208409 A1* | 8/2008 | Matsumoto et al. | 701/41 |
| 2014/0229068 A1* | 8/2014 | Ueyama et al. | 701/41 |

FOREIGN PATENT DOCUMENTS

| | | |
|---|---|---|
| JP | 2001-283390 | 10/2001 |
| JP | 2002-109694 | 4/2002 |
| JP | 2008-250904 | 10/2008 |
| JP | 2009-18626 | 1/2009 |
| JP | 2010-2953 | 1/2010 |
| JP | 2010-69921 | 4/2010 |

OTHER PUBLICATIONS

Mahmoud Efatmaneshnik et al., "A Cooperative Positioning Algorithm for DSRC Enabled Vehicular Networks", Archives of Photogrammetry, Cartography and Remote Sensing, vol. 22, 2011, pp. 117-129.

Michael Todd, Jay Farrell and Matthew Barth, "Connected Vehicle Technology Challenge: Lane-Level Vehicle Positioning using DSRC as an Aiding Signal", Proposing Organization: Transportation Systems Research Group, College of Engineering—Center for Environmental Research and Technology (CE-CERT), University of California, Riverside (UCR), May 2, 2011.

* cited by examiner

VEHICLE TRAVEL TRACK CONTROL DEVICE

TECHNICAL FIELD

The present invention relates to a vehicle travel track control device and, more particularly, to a vehicle travel track control device for controlling a vehicle travel along a target track (a target travel line) by controlling steered angle of steered wheels so that it conforms to a target steered angle.

BACKGROUND ART

Vehicle travel control devices have already been known which control vehicle travel by controlling steered angle of steered wheels so that it conforms to a target steered angle in a vehicle having a steered angle varying device which can vary a relationship of steered angle of steered wheels relative to steering position of a steering input means such as a steering wheel. As a type of vehicle travel control devices, various vehicle travel track control devices have been proposed which calculate a target steered angle of steered wheels for the vehicle to travel along a target travel line and control steered angle of the steered wheels so that it conforms to the target steered angle.

For example, in the below-mentioned patent citation 1, a vehicle travel track control device is described which is configured to determine whether or not a vehicle escapes from a lane on the basis of forward captured image information sent from a camera that captures a forward image ahead of the vehicle and map information sent from a navigation system.

CITATION LIST

Patent Literature 1: Japanese Patent Application Laid-open Publication No. 2002-109694

SUMMARY OF INVENTION

Technical Problem

In such a conventional vehicle travel track control device as described in the above-mentioned Laid-open Publication, a lane ahead of the vehicle is determined on the basis of captured forward image information obtained by a camera that captures a forward image ahead of the vehicle. However, as shown in FIG. 23, when a vehicle 100 travels along a lane 102 having a small curvature radius such as a sharply curved road or a winding road, the range 104 of the lane for which a camera can capture is limited. Accordingly, it is impossible to obtain enough forward information ahead of the vehicle to specify required information with respect to the lane and to execute the vehicle travel track control properly. For this reason, deterioration in accuracy of the vehicle travel track control cannot be avoided when curvature radius of the lane is small, and the vehicle travel track control cannot help being terminated when the range of the lane for which a camera can normally capture is unduly limited.

It is to be understood that the above-mentioned problem is not limited to a case where curvature radius of a lane is small but similarly arises in a case where a camera cannot properly capture an image ahead of a vehicle in such situations as, for example, rain and spray, rapid change in lightness around a vehicle such as entrance of a tunnel, and presence of a large vehicle in front of the vehicle.

Disclosure of the Invention

A primary object of the present invention is to continue the vehicle travel track control while preventing deterioration in accuracy as well as possible in a situation where forward information ahead of a vehicle enough to specify lane information cannot be obtained by a camera which captures image ahead of the vehicle.

The present invention provides a vehicle travel track control device comprising an image capture means which captures image around a vehicle, and a calculation/control unit which calculates a target steered angle of steered wheels on the basis of the captured image information sent from the image capture means and controls steered angle of steered wheels on the basis of the target steered angle to control the vehicle to travel along a lane, wherein in a situation where a target steered angle of steered wheels cannot properly be calculated on the basis of the captured forward image information ahead of the vehicle, the calculation/control unit calculates a target steered angle of steered wheels on the basis of captured image information obtained by varying at least one of capturing direction and capturing range of the image capture means.

According to the above-described configuration, even in a situation where a target steered angle of steered wheels cannot properly be calculated on the basis of the captured forward image information ahead of the vehicle, a target steered angle of steered wheels can be calculated on the basis of captured image information obtained by varying at least one of capturing direction and capturing range of the image capture means. Accordingly, as compared with a case where none of capturing direction and capturing range of the image capture means is varied, a possibility can be increased that a target steered angle of steered wheels can accurately be calculated, which enables to continue the travel track control while preventing an accuracy from deteriorating as well as possible.

The present invention also provides a vehicle travel track control device comprising an image capture means which captures image around a vehicle, and a calculation/control unit which calculates a target steered angle of steered wheels on the basis of the captured image information sent from the image capture means and controls steered angle of steered wheels on the basis of the target steered angle to control the vehicle to travel along a lane, wherein in a situation where a target steered angle of steered wheels cannot properly be calculated on the basis of the captured forward image information ahead of the vehicle, the image capture means captures side image on the side of the vehicle, and the calculation/control unit calculates a target steered angle of steered wheels on the basis of at least the captured side image information.

According to the above-described configuration, even in a situation where a target steered angle of steered wheels cannot properly be calculated on the basis of the captured forward image information ahead of the vehicle, a target steered angle of steered wheels can be calculated on the basis of at least the captured side image information. Accordingly, as compared with a case where side image on the side of the vehicle is not captured, a possibility can be increased that a target steered angle of steered wheels can accurately be calculated, which enables to continue the travel track control while preventing an accuracy from deteriorating as well as possible.

The above-mentioned configuration may be such that: the image capture means includes a forward image capture device which captures forward image ahead of a vehicle and a side image capture device which captures side image on at least one of the left and right sides of the vehicle; and the calculation/control unit calculates a target steered angle of the steered wheels on the basis of the captured forward image information sent from the forward image capture device in a situation where a target steered angle of the steered wheels can properly be calculated on the basis of the captured forward image information ahead of the vehicle and calculates a target steered angle of the steered wheels on the basis of at least the captured side image information sent from the side image capture device in a situation where a target steered angle of the steered wheels cannot properly be calculated on the basis of the captured forward image information ahead of the vehicle.

According to this configuration, a target steered angle of the steered wheels can be calculated on the basis of the captured forward image information sent from the forward image capture device in a situation where a target steered angle of the steered wheels can properly be calculated on the basis of the captured forward image information ahead of the vehicle. A target steered angle of the steered wheels can be calculated on the basis of at least the captured side image information sent from the side image capture device in a situation where a target steered angle of the steered wheels cannot properly be calculated on the basis of the captured forward image information ahead of the vehicle.

The above-mentioned configuration may be such that: the calculation/control unit calculates a target steered angle of the steered wheels on the basis of the captured forward image information sent from the forward image capture device in a situation where curvature radius of vehicle travel track is larger than a reference value, and calculates a target steered angle of the steered wheels on the basis of the captured side image information sent from the side image capture device in a situation where curvature radius of vehicle travel track is not larger than the reference value.

According to this configuration, a target steered angle of the steered wheels can be calculated on the basis of the captured forward image information sent from the forward image capture device in a situation where curvature radius of vehicle travel track is larger than a reference value. A target steered angle of the steered wheels can be calculated on the basis of the captured side image information sent from the side image capture device in a situation where curvature radius of vehicle travel track is not larger than the reference value.

The above-mentioned configuration may be such that: the calculation/control unit estimates at least one of parameters consisting of a lateral difference of the vehicle relative to a lane, a yaw angle of the vehicle relative to the lane and curvature radius of the lane on the basis of the captured image information, and calculates a target steered angle of the steered wheels on the basis of the estimated parameter or parameters.

According to this configuration, a target steered angle of the steered wheels can be calculated on the basis of at least one of the parameters consisting of a lateral difference of the vehicle relative to a lane, a yaw angle of the vehicle relative to the lane and curvature radius of the lane.

The above-mentioned configuration may be such that: the side image capture device captures side image on at least one of the left and right sides of the vehicle; and the calculation/control unit estimates lateral differences of the vehicle relative to a lane at front and rear reference positions spaced apart from each other longitudinally of the vehicle on the basis of the captured side image information, estimates yaw angle of the vehicle relative to the lane on the basis of the lateral differences of the vehicle relative to the lane at the front and rear reference positions, calculates a target lateral difference of the vehicle relative to the lane on the basis of the lateral differences of the vehicle and the yaw angle of the vehicle, and calculates a target steered angle of the steered wheels on the basis of at least the lateral differences of the vehicle and the target lateral difference of the vehicle.

According to this configuration, lateral differences of the vehicle and a target lateral difference of the vehicle are calculated, which enables to calculate a target steered angle of the steered wheels on the basis of at least the lateral differences of the vehicle and the target lateral difference of the vehicle.

The above-mentioned configuration may be such that: the calculation/control unit estimates curvature radius of the lane on the basis of the captured side image information, calculates a target yaw angle of the vehicle relative to the lane on the basis of the curvature radius of the lane, and calculates a target steered angle of the steered wheels on the basis of a difference between the lateral difference of the vehicle and the target lateral difference of the vehicle, a difference between yaw angle of the vehicle and the target yaw angle of the vehicle, and the curvature radius of the lane.

According to this configuration, a target steered angle of the steered wheels can be calculated on the basis of a difference between the lateral difference of the vehicle and the target lateral difference of the vehicle, a difference between yaw angle of the vehicle and the target yaw angle of the vehicle, and the curvature radius of the lane.

The above-mentioned configuration may be such that: the side image capture device captures side image on at least one of the left and right sides of the vehicle; and the calculation/control unit estimates yaw angles of the vehicle with respect to three time points on the basis of vehicle travel motion, estimates positions of the vehicle in rectangular coordinates with respect to the three time points on the basis of the yaw angles of the vehicle and vehicle travel motion, estimates lateral differences of the vehicle relative to the lane at a reference position of the vehicle with respect to the three time points on the basis of the captured side image information, estimates curvature radius of the lane on the basis of the lateral difference of the vehicle relative to the lane, the yaw angle of the vehicle and the position of the vehicle at the third time point, calculates a target yaw angle of the vehicle on the basis of the curvature radius of the lane, and calculates a target steered angle of the steered wheels on the basis of a difference between the lateral difference of the vehicle and the target lateral difference of the vehicle at the third time point, a difference between the yaw angle of the vehicle and the target yaw angle of the vehicle at the third time point, and the curvature radius of the lane.

According to this configuration, a target steered angle of the steered wheels for executing the vehicle travel track control can be calculated on the basis of a difference between the lateral difference of the vehicle and the target lateral difference of the vehicle at the third time point, a difference between the yaw angle of the vehicle and the target yaw angle of the vehicle at the third time point, and the curvature radius of the lane.

The above-mentioned configuration may be such that: the side image capture device captures side image on at least one of the left and right sides of the vehicle; and the calculation/control unit estimates lateral difference of the vehicle relative to a lane at a reference position of the vehicle on the basis of the captured side image information, calculates a target lateral difference of the vehicle relative to the lane on the basis of at least one of the lateral difference of the vehicle and width information of the lane, and calculates a target steered angle of the steered wheels on the basis of the lateral difference of the vehicle and the target lateral difference of the vehicle.

According to this configuration, a target steered angle of the steered wheels can be calculated on the basis of the lateral difference of the vehicle and the target lateral difference of the vehicle without calculating the curvature radius of the lane, yaw angle of the vehicle and a target yaw angle of the vehicle.

The above-mentioned configuration may be such that: the side image capture device includes a left side image capture device which captures left side image on the left side of the vehicle and a right side image capture device which captures right side image on the right side of the vehicle; and the calculation/control unit estimates lateral differences of the vehicle relative to a lane on the left and right sides of the vehicle on the basis of the captured left and right side image information, and calculates a target lateral difference of the vehicle relative to the lane on the basis of lateral differences of the vehicle relative to the lane on the left and right sides of the vehicle.

According to this configuration, a target lateral difference of the vehicle relative to the lane can be calculated on the basis of lateral differences of the vehicle relative to the lane on the left and right sides of the vehicle.

The above-mentioned configuration may be such that: the side image capture device captures side image on one of the left and right sides of the vehicle; and the calculation/control unit estimates lateral differences of the vehicle relative to a lane at front and rear reference positions spaced apart from each other longitudinally of the vehicle on the basis of the captured side image information, estimates yaw angle of the vehicle relative to the lane on the basis of the lateral differences of the vehicle relative to the lane at the front and rear reference positions, calculates curvature radius of the lane on the basis of the lateral differences of the vehicle, calculates a target yaw angle of the vehicle on the basis of the curvature radius of the lane, and, with a target lateral difference of the vehicle being one of a value variably set based on width of the lane and a predetermined value, calculates a target steered angle of the steered wheels on the basis of a difference between the lateral difference of the vehicle and the target lateral difference of the vehicle and a difference between the yaw angle of the vehicle and the target yaw angle of the vehicle.

According to this configuration, with a target lateral difference of the vehicle being one of a value variably set based on width of the lane and a predetermined value, a target steered angle of the steered wheels can be calculated on the basis of a difference between the lateral difference of the vehicle and the target lateral difference of the vehicle and a difference between the yaw angle of the vehicle and the target yaw angle of the vehicle.

The above-mentioned configuration may be such that: the calculation/control unit gradually changes a target steered angle of steered wheels when vehicle travel track control is interchanged between the mode where a target steered angle of the steered wheels is calculated on the basis of the captured forward image information sent from the forward image capture device and the mode where a target steered angle of the steered wheels is calculated on the basis of at least the captured side image information sent from the side image capture device.

According to this configuration, since a target steered angle of steered wheels is gradually changed when the modes of vehicle travel track control are interchanged, a target steered angle of steered wheels can be prevented from rapidly changing and a vehicle traveling condition can be prevented from rapidly changing when the modes of vehicle travel track control are interchanged.

The above-mentioned configuration may be such that: in a situation where curvature radius of vehicle travel track is not larger than the reference value, the calculation/control unit calculates a first target steered angle of the steered wheels on the basis of the captured forward image information sent from the forward image capture device and calculates a second target steered angle of the steered wheels on the basis of the captured side image information sent from the side image capture device, estimates forward observing distance by a driver on the basis of vehicle speed and the curvature radius of vehicle travel track, variably sets contribution degree of the second target steered angle so that the degree increases when image capture distance of the forward image capture device is shorter relative to forward observing distance as compared to a case where image capture distance of the forward image capture device is longer relative to forward observing distance, and calculates a target steered angle of the steered wheels on the basis of the first target steered angle, the second target steered angle and the contribution degree.

According to this configuration, contribution degree of the second target steered angle can variably be set in accordance with the relationship between the forward observing distance and the image capture distance of the forward image capture device, and a target steered angle of the steered wheels can be calculated on the basis of the first target steered angle of the steered wheels, the second target steered angle of the steered wheels and the contribution degree. Accordingly, a target steered angle of the steered wheels can be calculated by lowering the contribution degree of the second target steered angle when the image capture distance of the forward image capture device is longer relative to forward observing distance, and by enhancing the contribution degree of the second target steered angle when the image capture distance of the forward image capture device is shorter relative to forward observing distance.

The above-mentioned configuration may be such that: the image capture means includes a forward image capture device which captures forward image ahead of a vehicle and a side image capture device which captures side image on at least one of the left and right sides of the vehicle; and, in a situation where a target steered angle of the steered wheels can properly be calculated on the basis of the captured forward image information ahead of the vehicle, the calculation/control unit calculates a target steered angle of the steered wheels on the basis of the captured forward image information sent from the forward image capture device; and, in a situation where a target steered angle of the steered wheels cannot properly be calculated on the basis of the captured forward image information ahead of the vehicle, the calculation/control unit supplements captured image on the basis of the captured side image information sent from the side image capture device and calculates a target steered angle of the steered wheels on the basis of the captured image after supplementation.

According to this configuration, in a situation where a target steered angle of the steered wheels cannot properly be calculated on the basis of the captured forward image information ahead of the vehicle, captured image can be supplemented on the basis of the captured side image information sent from the side image capture device and a target steered angle of the steered wheels can be calculated on the basis of the captured image after supplementation.

The above-mentioned configuration may be such that: the calculation/control unit specifies white lines of the lane on the basis of the captured forward image information sent from the forward image capture device and, when information with respect to any white line of the lane specified on the basis of the captured forward image information is insufficient in a situation where a target steered angle of the steered wheels is calculated on the basis of the information with respect to the white lines of the lane, the calculation/control unit supplements information with respect to the white line or lines of the lane with information with respect to the white line or lines of the lane specified on the basis of the captured side image information sent from the side image capture device and calculates a target steered angle of the steered wheels on the basis of the information with respect to the white lines of the lane after supplementation.

According to this configuration, when information with respect to any white line of the lane specified on the basis of the captured forward image information is insufficient, information with respect to the white line or lines of the lane can be supplemented with information with respect to the white line or lines of the lane specified on the basis of the captured side image information sent from the side image capture device. Accordingly, even when information with respect to the white line of the lane specified on the basis of the captured forward image information is insufficient, a target steered angle of the steered wheels can accurately be calculated on the basis of the information with respect to the white lines of the lane after supplementation.

The above-mentioned configuration may be such that: the calculation/control unit terminates the control of vehicle travel track when at least a length of any white line of the lane specified on the basis of the captured forward image information is not larger than an associated reference length or a length of any white line of the lane specified on the basis of the captured side image information sent from the side image capture device is not larger than an associated reference length.

According to this configuration, the control of vehicle travel track is terminated when at least one of a length of any white line of the lane specified on the basis of the captured forward image information and a length of any white line of the lane specified on the basis of the captured side image information sent from the side image capture device is not larger than an associated reference length. Accordingly, in a situation where any of the white line of the lane specified on the basis of the captured forward image information and the white line of the lane specified on the basis of the captured side image information is insufficient in length, it is possible to prevent the vehicle travel track control in accordance with the white lines from being improperly continued.

The above-mentioned configuration may be such that: the vehicle has a lighting system which can vary irradiation direction and/or irradiation range; the calculation/control unit varies the irradiation direction and/or irradiation range of the lighting system so that information with respect to the specified white lined of the lane is increased when information with respect to any white line of the lane specified on the basis of the captured forward image information is temporarily insufficient.

According to this configuration, when information with respect to any white line of the lane specified on the basis of the captured forward image information is temporarily insufficient, the irradiation direction and/or irradiation range of the lighting system is varied so that information with respect to the specified white lines of the lane is increased, which increases information of the white lines of specified lane. Accordingly, it is possible to decrease a risk to terminate the vehicle travel track control for the reason that any white line of the lane specified on the basis of the captured side image information is sufficient in length as compared with a case where the irradiation direction and/or irradiation range of the lighting system is not varied.

The above-mentioned configuration may be such that: the calculation/control unit decreases vehicle speed to continue the control of vehicle travel track in either case where there is a risk for the vehicle to escape from the lane or the performance of the image capture means deteriorates in image capture accuracy.

According to this configuration, vehicle speed is decreased to continue the control of vehicle travel track in either case where there is a risk for the vehicle to escape from the lane or the performance of the image capture means deteriorates in image capture accuracy. Accordingly, it is possible to decrease a risk that the vehicle can not travel along a lane due to a relative delay in controlling steered angle of the steered wheels by the vehicle travel track control as compared with a case where vehicle speed is not decreased.

DESCRIPTION OF EMBODIMENTS

Some preferred embodiments of the present invention will be described in detail with reference to the accompanying drawings.

First Embodiment

Figure 1:
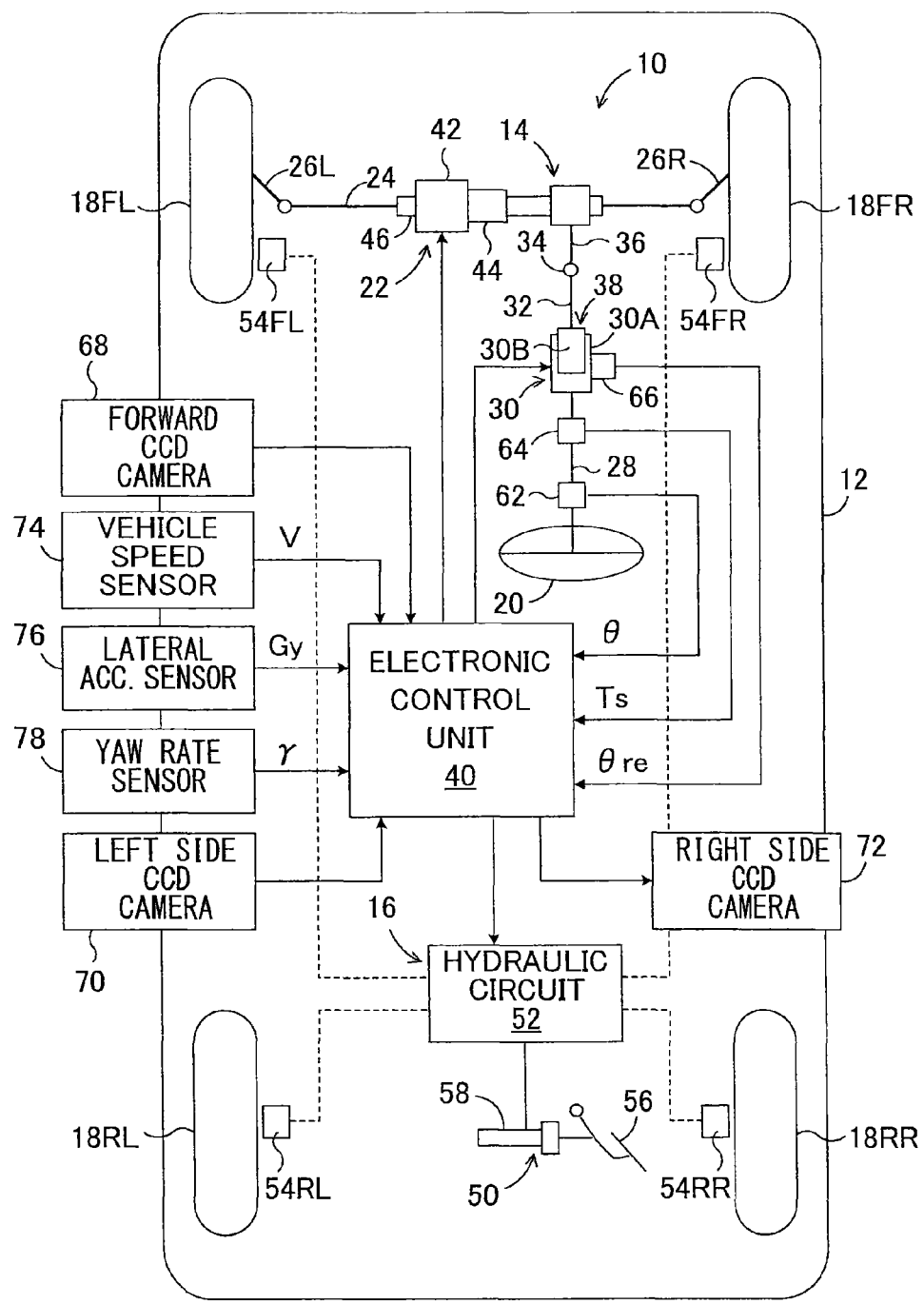
FIG. 1 is a schematic configurational view showing a first embodiment of a vehicle travel track control device according to the present invention.

FIG. 1 is a schematic configurational view showing a first embodiment of a vehicle travel track control device according to the present invention.

Referring to FIG. 1, a vehicle travel track control device 10 is installed in a vehicle 12 and includes a front wheel steering control device 14. The front wheel steering control device 14 serves as a steering control means which is capable of steering front wheels irrespective of steering operation of a driver. The vehicle 12 is equipped with a braking force control device 16 which is capable of individually controlling braking force of each wheel irrespective of braking operation of the driver.

In FIG. 1, reference numerals 18FL and 18FR respectively denote left and right front wheels, which are steerable wheels; and 18RL and 18RR respectively denote left and right rear wheels. The right and left front wheels 18FR, 18FL, which are steerable wheels, are steered by a power steering unit 22 of a rack and pinion type via a rack bar 24 and tie rods 26L and 26R, respectively. The power steering unit is driven in response to steering operation of a steering wheel 20 by a driver.

The steering wheel 20 is drivingly connected to a pinion shaft 36 of the power steering unit 22 via an upper steering shaft 28, a steered angle varying unit 30, a lower steering shaft 32, and a universal joint 34. In the first embodiment shown in the figure, the steered angle varying unit 30 includes an electric motor 38 for supplementary steering driving. The electric motor 38 has a housing 30A linked to a lower end of the upper steering shaft 28 and a rotor 30B linked to an upper end of the lower steering shaft 32.

As is apparent from the above, the steered angle varying unit 30 rotates the lower steering shaft 32 relative to the upper steering shaft 28 so as to drive, for supplementary steering, the left and right front wheels 18FL and 18FR relative to the steering wheel 20. The steered angle varying unit 30 is controlled by a steering control section of an electronic control unit 40.

The electric power steering unit 22 is an electric power steering unit located concentric with the rack bar. The power steering unit 22 includes an electric motor 42 and a mechanism that converts the rotational torque of the electric motor 42 into a force in a reciprocating direction of the rack bar 24 such as, for example, a ball-screw type converting mechanism 44. The power steering unit 22 is controlled by a steering assist torque control section of the electronic control unit 40 and generates steering assist torque to drive the rack bar 24 relative to a housing 46. The steering assist torque reduces steering load on the driver and as necessary assists steering actuation of the left and right front wheels by the steered angle varying unit 30.

As is understood from the above, the steered angle varying unit 30 constitutes a main part of the front wheel steering control device 14 which cooperates with the power steering unit 22 to change the relationship of the steered angle of the left and right front wheels relative to the steering wheel 20 and steers the front wheels irrespective of steering operation of the driver.

It is to be noted that since the configurations of the power steering unit 22 and the steered angle varying unit 30 do not constitute the gist of the present invention, these devices may be of any configuration known in the art so long as they perform the above-mentioned functions.

The braking force control device 16 includes a braking unit 50. Braking forces of the wheels are controlled through control of the internal pressures Pi (i=fl, fr, rl, rr) of respective wheel cylinders 54FL, 54FR, 54RL, 54RR, i.e. brake pressures by a hydraulic circuit 52 of the braking unit 50. Although not shown in FIG. 1, the hydraulic circuit 52 includes a reservoir, an oil pump, various valve units, and the like. Brake pressure in each wheel cylinder is usually controlled by pressure in a master cylinder 58 driven by driver's operation of depressing a brake pedal 56. Brake pressure in each wheel cylinder is also individually controlled as necessary by means of the hydraulic circuit 52 being controlled by a braking force control section of the electronic control unit 40. Thus, the braking unit 50 is capable of individually controlling braking force of each wheel irrespective of braking operation of the driver and serves as a main device of the braking force control device 16.

The upper steering shaft 28 is provided with a steering angle sensor 62 which detects a rotational angle of the upper steering shaft 28 as a steering angle θ and a steering torque sensor 64 which detects a steering torque Ts. Signals indicative of a steering angle θ and a steering torque Ts are input to the electronic control unit 40. The electronic control unit 40 receives a signal indicative of a relative rotation angle θre of the steered angle varying unit 30 detected by a rotation angle sensor 66, which is a rotation angle of the lower steering shaft 32 relative to the upper steering shaft 28.

In the embodiment shown in the figure, a forward CCD camera 68 which captures a forward image ahead of the vehicle 12 is provided at a front part of the cabin of the vehicle 12, and a signal indicative of the forward image information ahead of the vehicle 12 is input to the electronic control unit 40 from the CCD camera 68. A left side CCD camera 70 and a right side CCD camera 72 which capture side images on the left and right sides of the vehicle 12, respectively are provided at left and right side parts of the vehicle 12, and signals indicative of the side image information on the left and right sides of the vehicle 12 are input to the electronic control unit 40 from the CCD cameras 70 and 72.

The electronic control unit 40 additionally receives a signal indicative of a vehicle speed V detected by a vehicle speed sensor 74, a signal indicating lateral acceleration Gy detected by a lateral acceleration sensor 76 and a signal indicating actual yaw rate γ detected by a yaw rate sensor 78. The electronic control unit 40 further receives signals indicative of a master cylinder pressure Pm detected by a pressure sensor not shown in FIG. 1 and the like.

The individual sections of the electronic control unit 40 may be those which comprise microcomputers and each microcomputer may have CPU, ROM, RAM, and an input/output port connected with one another via a bidirectional common bus. The steering angle sensor 62, the steering torque sensor 64 and the rotation angle sensor 66 detect a steering angle θ, a steering torque Ts and a relative rotation angle θre, respectively with the detected variables being positive when steering or vehicle turning is conducted in left turning direction of the vehicle.

In a normal situation the steering control section of the electronic control unit 40 executes a travel track control, being referred to a lane keeping assist control (LKA control), on the basis of the forward image information ahead of the vehicle 12 acquired by the forward CCD camera 68. That is, the steering control section determines a lane on the basis of the forward image information ahead of the vehicle 12 acquired by the forward CCD camera 68, calculates a target steered angle δt of the front wheels for making the vehicle 12 travel along the lane, and controls the steered angle varying unit 30 so that the steered angle δ of the front wheels conforms to the target steered angle δt.

By contrast, in a situation where the steering control section of an electronic control unit 40 cannot properly execute the travel track control on the basis of the forward image information ahead of the vehicle 12 acquired by the forward CCD camera 68, the steering control section executes an alternative travel track control. In the alternative travel track control, the steering control section determines a lane on the basis of the side image information on either side of the vehicle 12 acquired by the left side CCD camera 70 or the right side CCD camera 72. The steering control section calculates a target pinion angle φt corresponding to a target steered angle δt of the front wheels for making the vehicle 12 travel along the lane, and controls the steered angle varying unit 30 so that the angle φ of the pinion shaft 36 conforms to the target pinion angle φt.

It is to be understood that in either of the normal and alternative travel track controls, the steering control section of the electronic control unit 40 estimates a lateral difference of the vehicle relative to a lane, a yaw angle of the vehicle relative to the lane and a curvature radius of the lane, and calculates a target steered angle of the steered wheels on the basis of the estimated parameters.

Figure 2:
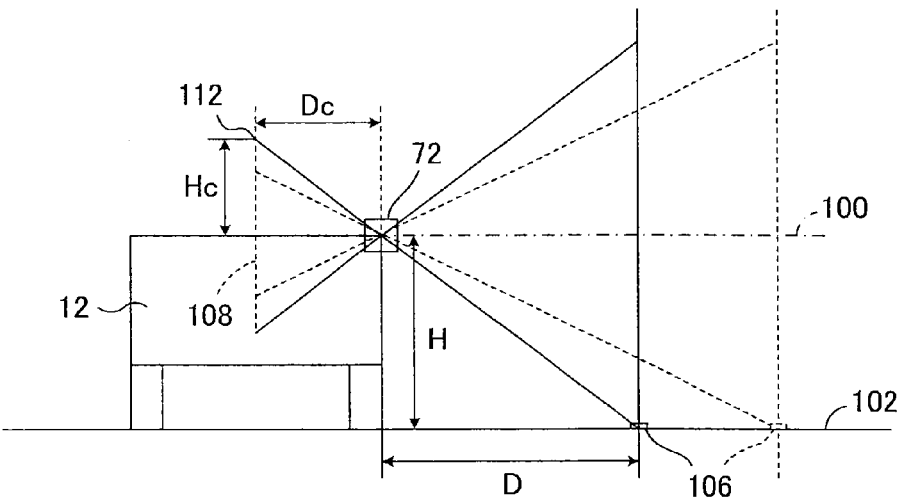
FIG. 2 is an explanatory illustration as viewed from the back of the vehicle showing the image capture by the right side CCD camera and the manner for acquiring white line information.

FIG. 2 is an explanatory illustration as viewed from the back of the vehicle showing the image capture by the right side CCD camera 72 and the manner for acquiring white line information.

As shown in FIG. 2, a height of the right side CCD camera 72 from a lane 102 is represented by H and a horizontal distance between the right side edge of the vehicle 12 and a white line 106 is represented by D. A distance between a lens of the right side CCD camera 72 and a image capturing plane 108 is represented by Dc and a distance between a light axis 110 of the right side CCD camera 72 and an image 112 of the white line 106 at the image capturing plane 108 is represented by Hc. The following Formula 1 holds based on the relationship of similar figures including the distances.

$$Hc:H=Dc:D \quad (1)$$

Since the following Formula 2 is derived from the above Formula 1, the horizontal distance D between the right side edge of the vehicle 12 and a white line 106 can be calculated in accordance with the following Formula 2. It is to be understood that a horizontal distance between the left side edge of the vehicle 12 and a white line can be calculated in a similar manner.

$$D=DcH/Hc \quad (2)$$

Figure 3:
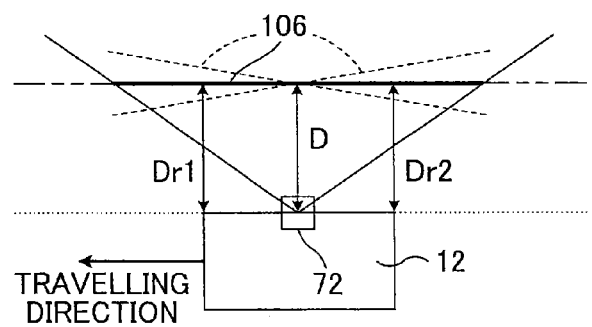
FIG. 3 is an explanatory illustration as viewed from the above of the vehicle showing the image capture by the right side CCD camera and the manner for acquiring white line information.

As shown in FIG. 3, if the right side CCD camera 72 has a angle of view which is wide enough in relation to the horizontal distance D between the right side edge of the vehicle 12 and a white line 106, it can capture and determine the white line 106 in the range beyond the longitudinal length of the vehicle 12. In particular, horizontal distances Dr1 and Dr2 between the right side edges at the front and rear ends of the vehicle 12, respectively, and a white line 106 can be calculated. Horizontal distances Dl1 and Dl2 between the left side edges at the front and rear ends of the vehicle 12, respectively, and a white line 106 can be calculated in a similar manner.

Figure 4:
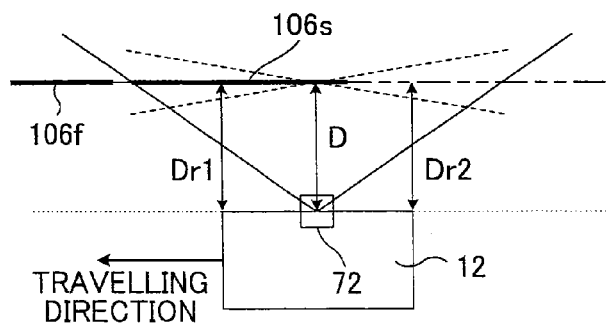
FIG. 4 is an explanatory illustration as viewed from the above of the vehicle showing the manner where white line information obtained by the image capture by the forward CCD camera is supplemented by white line information obtained by the image capture by the right side CCD camera.

As shown in FIG. 4, a white line is represented by 106f which is determined based on the image information that is captured by the forward CCD camera 68. Even in a case where the length of the white line 106f is shorter than that which is required to determine a curvature radius and the like of a lane, the information of a white line can be supplemented with information of a supplemental white line 106s which is specified based on the image information captured by the right side CCD camera 72, and a required length of the white line can be ensured.

Figure 5:
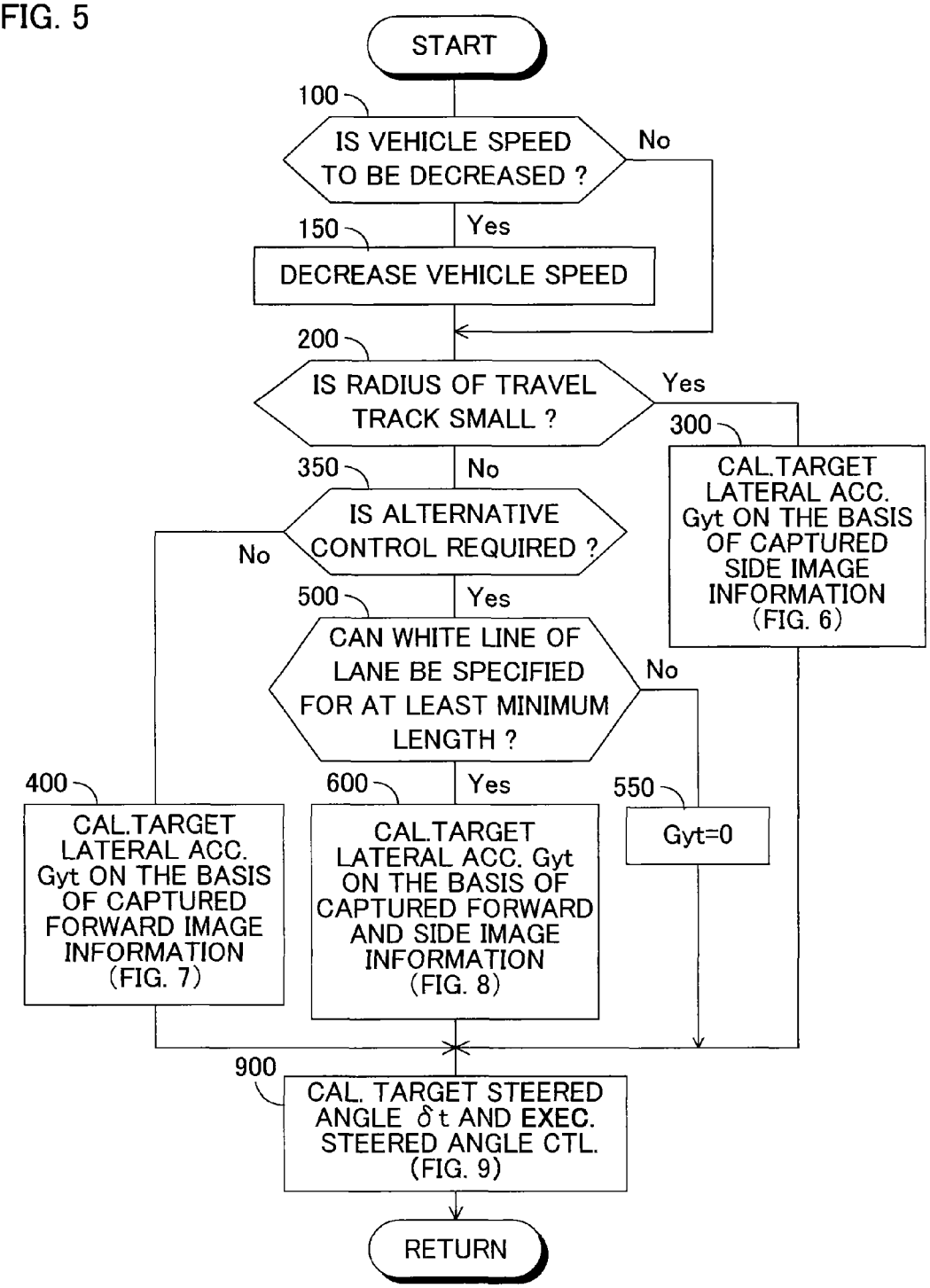
FIG. 5 is a flowchart showing a main routine of the vehicle travel track control in the first embodiment.

Next, referring to the flowchart shown in FIG. 5, a main routine of the vehicle travel track control in the first embodiment will be explained. It is to be noted that the control in accordance with the flowchart shown in FIG. 5 is started when an ignition switch not shown in the figure is turned on, and is repeatedly executed at predetermined intervals.

First, in step 100, a decision is made as to whether or not vehicle speed is to be decreased to ensure execution of the vehicle travel track control. When a negative decision is made, the control proceeds to step 200, while when an affirmative decision is made, the control proceeds to step 150. When there is a risk that the vehicle escapes from a lane or the image capturing of the CCD camera is deteriorated in accuracy, a decision may be made that vehicle speed is to be reduced to ensure execution of the vehicle travel track control.

In step 150, vehicle speed V is decreased by ΔV by means of the output of an engine not shown in FIG. 1 being decreased and, if further necessary, the braking device being actuated. It is to be noted that the decrease amount ΔV of vehicle speed is variably set according to vehicle speed so that the decrease amount increases as vehicle speed V increases. In addition, the decrease amount ΔV of vehicle speed may variably be set so that the amount increases as the risk of the vehicle in escaping from the lane increases or as the deterioration degree in the image capturing accuracy of the CCD camera increases.

In step 200, with the magnitude of the curvature radius R of the lane calculated in the former cycle being expressed by a radius Rv of travel track, a decision is made as to whether or not the radius Rv is not larger than a predetermined reference value. When an affirmative decision is made, in step 300, a target lateral acceleration Gyt of the vehicle is calculated on the basis of the captured side image information in accordance with the flowchart shown in FIG. 6, while when a negative decision is made, the control proceeds to step 350. It is to be understood that if the vehicle is equipped with a navigation system, the turn radius Rv may be derived from lane information afforded by the navigation system.

In step 350, a decision is made as to whether or not an alternative track control is required in which a target lateral acceleration Gyt of the vehicle is calculated on the basis of the captured side image information. When a negative decision is made, in step 400, a target lateral acceleration Gyt of the vehicle is calculated on the basis of the captured forward image information in accordance with the flowchart shown in FIG. 7, while when an affirmative decision is made, the control proceeds to step 500.

In step 500, a decision is made as to whether or not a white line of the lane can be specified for a length not smaller than a predetermined minimum reference length on the basis of the captured forward image information. When a negative decision is made, in step 550, a target lateral acceleration Gyt of the vehicle is set to 0, while when an affirmative decision is made, the control proceeds to step 600. It is to be understood that modification may be made that a decision is also made as to whether or not a white line of the lane can be specified for a length not smaller than a predetermined minimum reference length on the basis of the captured side image information, and when a negative decision is made, the control proceeds to step 550.

Figure 8:
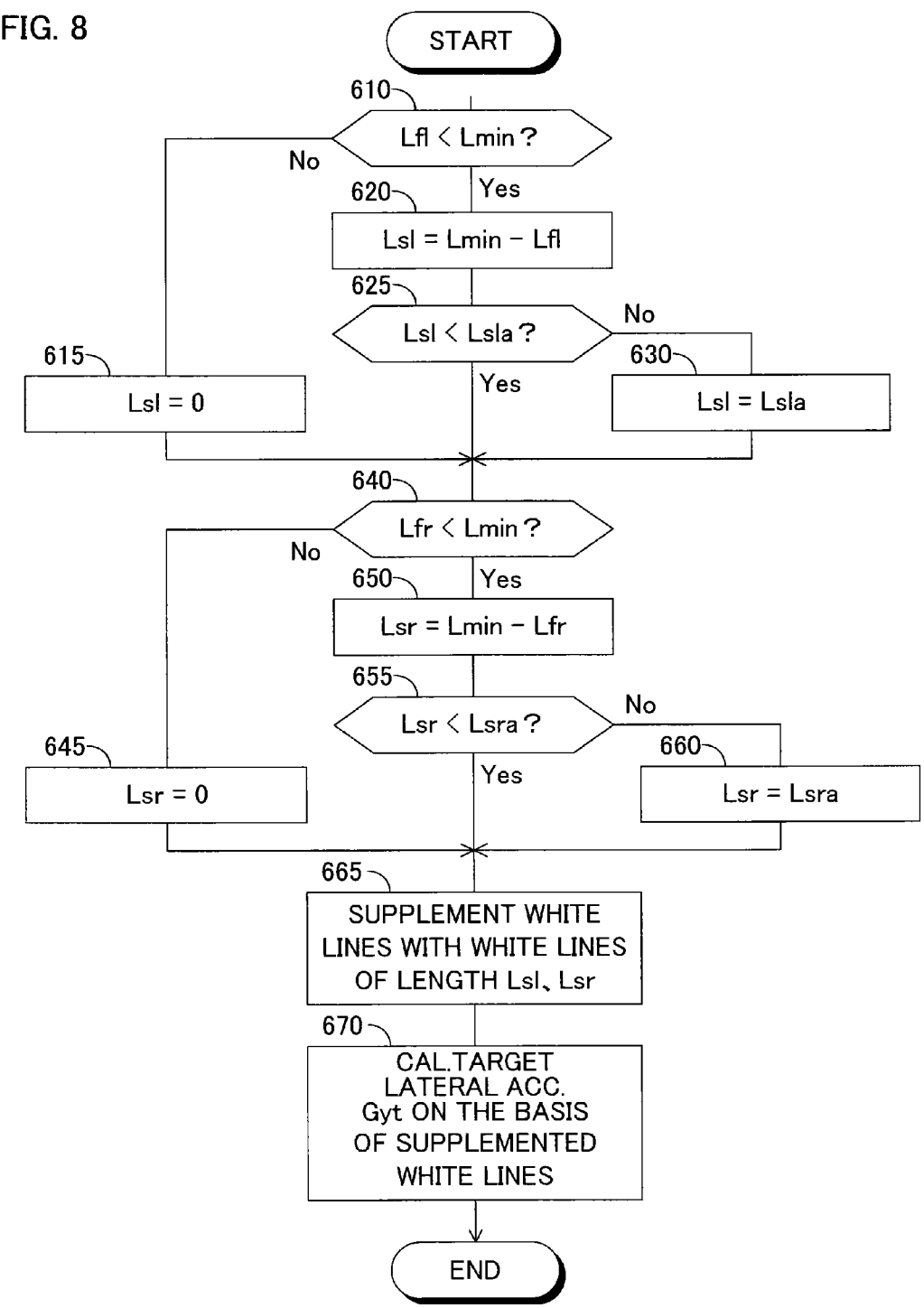
FIG. 8 is a flowchart showing a routine for calculating a target lateral acceleration Gyt based on captured front and side image information which is conducted in step 600 shown in FIG. 5.

In step 600, a target lateral acceleration Gyt of the vehicle is calculated on the basis of the captured forward and side image information in accordance with the flowchart shown in FIG. 8.

After completion of the steps 300, 400, 550 or 600, the control proceeds to step 900. In step 900, a target steered angle δt of the front wheels are calculated in accordance with the flowchart shown in FIG. 9 and the steered angle of the front wheels are controlled in accordance with the target steered angle δt.

Next, referring to the flowchart shown in FIG. 6, will be explained a routine for calculating target lateral acceleration Gyt on the basis of the captured side image information which is conducted in the above-mentioned step 300.

In step 310, white lines of the lane are specified on the basis of the captured forward and side image information, and curvature radiuses Rsl and Rsr of left and right white lines are calculated on the basis of the specified white lines. Further, curvature radius Rs of the lane is calculated to an average value of the curvature radiuses Rsl and Rsr. It is to be noted that curvature radius Rs of the lane may be calculated on the basis of one of the curvature radiuses Rsl and Rsr.

Figure 19:
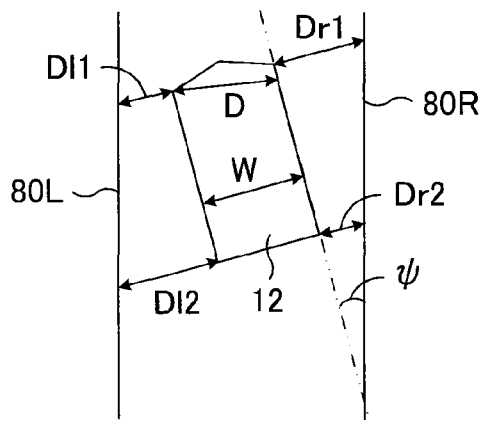
FIG. 19 is an explanatory illustration showing a manner for calculating distances Dr1 and Dr2 in lateral direction of the vehicle between side edges at front and rear ends of the vehicle and right side white line in the first embodiment.

In step 315, with front and rear reference positions of the vehicle being set to front and rear ends of the vehicle, as shown in FIG. 19, are calculated distances Dr1 and Dr2 between side edges at the front and rear ends of the vehicle 12 and a white line 80R on the right side.

In step 320, with a distance between the front and the rear ends of the vehicle being represented by L, yaw angle φs of the vehicle relative to the lane is calculated on the basis of the distances Dr1 and Dr2 on the right side in accordance with the following Formula 3.

$$\varphi s = \tan^{-1}\left(\frac{Dr1 - Dr2}{L}\right) \quad (3)$$

The yaw angle φs of the vehicle may be calculated on the basis of the distances Dl1 and Dl2 on the left side in accordance with the following Formula 4, and may be an simple average value or a weighed average value of the values calculated in accordance with the Formulae 3 and 4.

$$\varphi s = \tan^{-1}\left(\frac{Dl2 - Dl1}{L}\right) \quad (4)$$

In step 325, with the width of the vehicle being represented by W, a target lateral difference Dst relative to the center of the lane is calculated on the basis of the distances Dr1, Dr2 on the right side and yaw angle φs of the vehicle in accordance with the following Formula 5. After step 325 has been completed, the control proceeds to step 360. The target lateral difference Dst is a target distance between the right side edge of the vehicle and the right side edge of the lane (right side white line) or between the left side edge of the vehicle and the left side edge of the lane (left side white line) which is required for the center of the vehicle to travel along the center of the lane.

$$Dst = \frac{Dr1\cos\varphi s + W/\cos\varphi s + Dl1\cos\varphi s - W}{2} \quad (5)$$

In step 360, a target yaw angle φst of the vehicle is calculated to a very small value which has the same sign as the curvature radius Rs of the lane calculated in step 310 and increases in magnitude as the radius Rs increases in magnitude.

In step 365, an average of the right lateral differences Dr1 and Dr2 is calculated as an actual right lateral differences Ds, and a target lateral acceleration Gyts of the vehicle based on the captured side image information is calculated in accordance with the following Formula 6 in which Ksr, Ksy and Ksh are predetermined positive coefficients.

$$Gyts = KsrRs + Ksy(Dst-Ds) + Ksh(\varphi st - \varphi s) \quad (6)$$

In step 370, a decision is made as to whether or not a correction coefficient Ks is 1, i.e. whether or not the calculation mode has been changed from the mode in which a target lateral acceleration Gytf of the vehicle is calculated on the basis of the captured forward image information to the mode in which a target lateral acceleration Gyts of the vehicle is calculated on the basis of the captured side image information. When an affirmative decision is made, in step 375, a target lateral acceleration Gyt of the vehicle is set to the target lateral acceleration Gyts of the vehicle based on the basis of the captured side image information, while when a negative decision is made, the control proceeds to step 380.

In step 380, a target lateral acceleration Gytf of the vehicle is calculated on the basis of the captured forward image information. It is to be understood that as in steps 310-365, a curvature radius of the lane, a lateral difference of the vehicle, a yaw angle of the vehicle, a target lateral difference of the vehicle and a target yaw angle of the vehicle are calculated, and a target lateral acceleration Gytf is calculated on the basis of these values. A target lateral acceleration Gytf may be calculated in any other manners.

Figure 15:
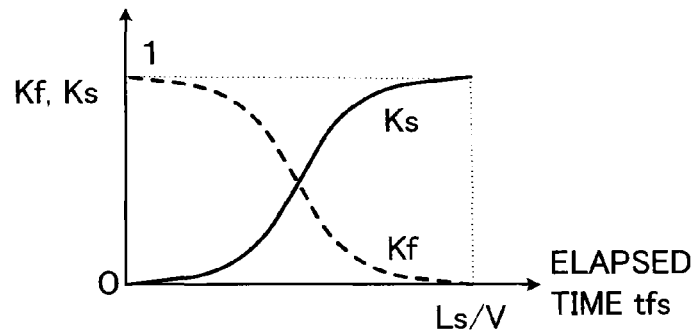
FIG. 15 is a diagram showing a map for calculating correction coefficients Kf and Ks on the basis of elapsed time tfs.

In step 385, correction coefficients Kf and Ks are calculated from the map shown in FIG. 15 on the basis of time tfs elapsed from the time point where the decision in step 200 has changed from negative to affirmative. As shown in FIG. 15, the correction coefficient Kf decreases from 1 to 0 as the elapse time tfs increases, whereas the correction coefficient Ks increases from 0 to 1 as the elapse time tfs increases. The total of the correction coefficients Kf and Ks is 1 irrespective of the elapse time tfs.

In step 390, a target lateral acceleration Gyt of the vehicle is calculated in accordance with the following Formula 7.

$$Gyt = KfGytf + KsGyts \quad (7)$$

Next, referring to the flowchart shown in FIG. 7, will be explained a routine for calculating target lateral acceleration Gyt on the basis of the captured forward image information which is conducted in the above-mentioned step 400.

In step 410, as in step 380, a target lateral acceleration Gytf of the vehicle is calculated on the basis of the captured forward image information.

In step 415, a decision is made as to whether or not the correction coefficient Kf is 1, i.e. whether or not the calculation mode has been changed from the mode in which a target lateral acceleration Gyts of the vehicle is calculated on the basis of the captured side image information to the mode in which a target lateral acceleration Gytf of the vehicle is calculated on the basis of the captured forward image information. When an affirmative decision is made, in step 420, a target lateral acceleration Gyt of the vehicle is set to the target lateral acceleration Gytf of the vehicle based on the basis of the captured forward image information, while when a negative decision is made, the control proceeds to step 425.

In step 425, as in steps 310-365, a target lateral acceleration Gyts of the vehicle is calculated on the basis of the captured side image information.

Figure 16:
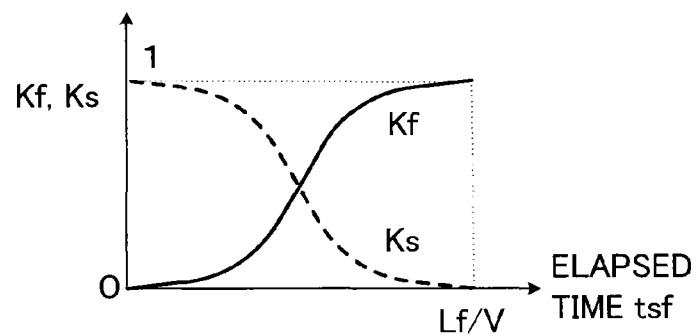
FIG. 16 is a diagram showing a map for calculating correction coefficients Kf and Ks on the basis of elapsed time tsf.

In step 430, correction coefficients Kf and Ks are calculated from the map shown in FIG. 16 on the basis of time tsf elapsed from the time point where the decision in step 200 has changed from affirmative to negative. As shown in FIG. 16, the correction coefficient Kf increases from 0 to 1 as the elapse time tsf increases, whereas the correction coefficient Ks decreases from 1 to 0 as the elapse time tsf increases. The total of the correction coefficients Kf and Ks is 1 irrespective of the elapse time tsf.

In step 435, as in step 390, a target lateral acceleration Gyt of the vehicle is calculated in accordance with the Formula 7.

Next, referring to the flowchart shown in FIG. 8, is explained a routine for calculating target lateral acceleration Gyt on the basis of the captured forward and side image information which is conducted in the above-mentioned step 600.

In step 610, a decision is made as to whether or not a length Lfl of the left side white line specified on the basis of the captured forward image information is smaller than a length Lmin which is a minimum length required to execute the travel track control of the vehicle. When a negative decision is made, in step 615, a supplemental length Lsl is set to 0 which is a length to be supplemented with a left side white line specified on the basis of the captured side image information, while when an affirmative decision is made, in step 620, a supplemental length Lsl is set to Lmin−Lfl.

In step 625, with a length of the left side white line which is specified on the basis of the captured side image information being represented by Lsla, a decision is made as to whether or not a supplemental length Lsl is smaller than Lsla. When an affirmative decision is made, the control proceeds to step 640, while when a negative decision is made, in step 630, a supplemental length Lsl is set to Lsla.

Likewise, in step 640, a decision is made as to whether or not a length Lfr of the right side white line specified on the basis of the captured forward image information is smaller than the minimum length Lmin. When a negative decision is made, in step 645, a supplemental length Lsr is set to 0 which is a length to be supplemented with a right side white line specified on the basis of the captured side image information, while when an affirmative decision is made, in step 650, a supplemental length Lsr is set to Lmin−Lfr.

In step 655, with a length of the right side white line which is specified on the basis of the captured side image information being represented by Lsra, a decision is made as to whether or not a supplemental length Lsr is smaller than Lsra. When an affirmative decision is made, the control proceeds to step 665, while when a negative decision is made, in step 660, a supplemental length Lsr is set to Lsra.

In step 665, the left and right side white lines are supplemented with white lines of supplemental length Lsl and Lsr, respectively. In step 670, a target lateral acceleration Gyt of the vehicle is calculated on the basis of the supplemented left and right side white lines in a manner similar to that in step 410 wherein target lateral acceleration Gytf is calculated.

Figure 9:
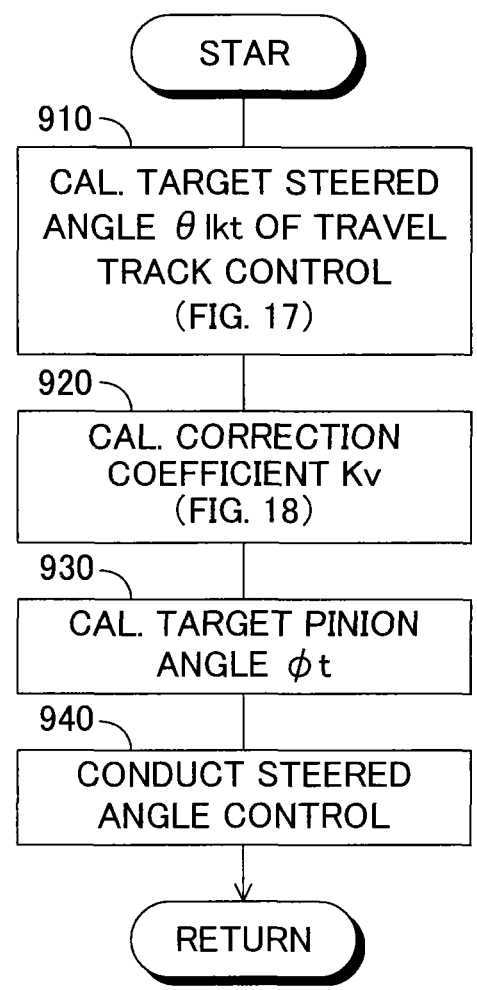
FIG. 9 is a flowchart showing a routine for calculating a target steered angle δt and controlling steered angle which is conducted in step 900 shown in FIG. 5.

Next, referring to the flowchart shown in FIG. 9, will be explained routines for calculating target pinion angle $\phi t$ and for controlling steered angle of the front wheels in accordance with the target pinion angle $\phi t$ which are conducted in the above-mentioned step 900.

Figure 17:
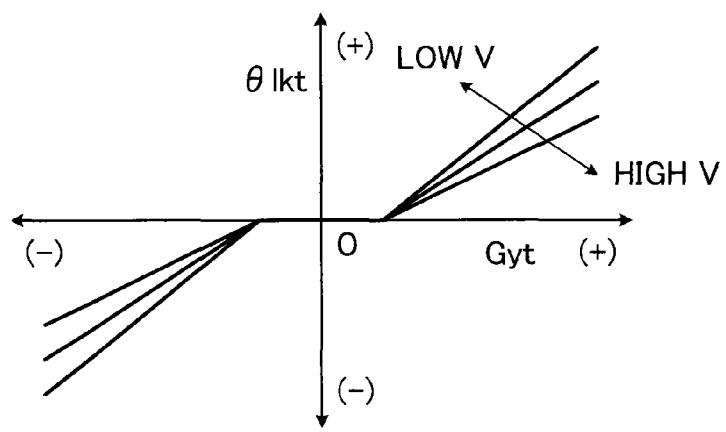
FIG. 17 is a diagram showing a map for calculating a target steered angle θlkt of the vehicle travel track control on the basis of a target lateral acceleration Gyt of the vehicle and vehicle speed V.

In step 910, a target steered angle $\theta lkt$ of the travel track control is calculated from the map shown in FIG. 17 on the basis of the lateral acceleration Gyt of the vehicle and vehicle speed V.

Figure 18:
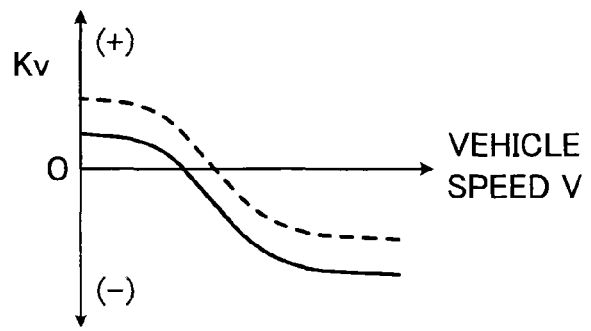
FIG. 18 is a diagram showing a map for calculating a correction coefficient Kv on the basis of vehicle speed V.

In step 920, a correction coefficient Kv based on vehicle speed is calculated from the map shown in solid line in FIG. 18 on the basis of the vehicle speed V. It is to be noted that in FIG. 18, broken line shows a correction coefficient Kv based on vehicle speed for a case where the travel track control is not conducted.

In step 930, a target pinion angle $\phi klt$ is calculated on the basis of a steered angle corrected with a target steered angle $\theta klt$, i.e. $\theta - \theta klt$ in accordance with the following Formula 8. The target pinion angle is a target angle of the pinion 36 corresponding to a target steered angle $\delta t$ of the front wheels.

$$\Phi klt = Kv(\theta - \theta klt) \tag{8}$$

In step 940, with $\Delta \phi t$ being assumed to be a parameter for preventing the steered angle varying unit 30 from steering the front wheels excessively when a steering input is afforded, the steered angle varying unit 30 is controlled so that pinion angle $\phi$ conforms to a final target pinion angle $\phi t + \Delta \phi t$, and the steered angle $\delta$ of the front wheels is controlled to a target steered angle $\delta t$ corresponding to the target pinion angle $\phi t + \Delta \phi t$.

Thus, according to the first embodiment, even in a situation where the travel track control cannot properly be executed on the basis of captured forward image information, the control can be continued on the basis of captured side image information obtained by the side CCD camera 70 or 72. Therefore, a possibility to properly execute the travel track control can be increased as compared to a case where no image on either side of a vehicle is captured, which enables to continue the travel track control while preventing the accuracy thereof from being deteriorated as well as possible.

It is to be understood that when the travel track control properly executed on the basis of captured forward image information can be recovered in a situation where the travel track control is executed on the basis of captured side image information, negative decisions are made in steps 200 and 350, and the control will proceed to step 400. Therefore, it is possible to prevent the travel track control from being unnecessarily executed on the basis of captured side image information in spite of the fact that the travel track control can properly be executed on the basis of captured forward image information.

A length of a lane ahead of the vehicle which can be specified in the travel track control based on captured side image information is shorter than that which can be specified in the travel track control based on captured forward image information. However, a possibility that the vehicle travels along a lane without fail can be increased as compared to a case where the travel track control based on captured forward image information is terminated.

According to the first embodiment, it is possible to prevent a rapid change in a target lateral acceleration Gyt of the vehicle from occurring by means of the correction coefficients Kf and Ks when an interchange is conducted between the control mode where a target lateral acceleration Gyt of the vehicle is calculated on the basis of captured forward image information and the control mode where a target lateral acceleration is calculated on the basis of captured side image information. Accordingly, it is also possible to prevent vehicle travel condition from abruptly changing due to a rapid change in target lateral acceleration Gyt accompanying the control mode change. It is to be noted that this effect can as well be achieved in the other embodiments described later.

In particular, according to the first embodiment, if an affirmative decision is made in step 350, the decision in step 500 is conducted. If a decision is made that a white line ahead of the vehicle can be specified for a length not smaller than the predetermined minimum reference length on the basis of captured forward image information, step 600 is conducted.

Figure 20:
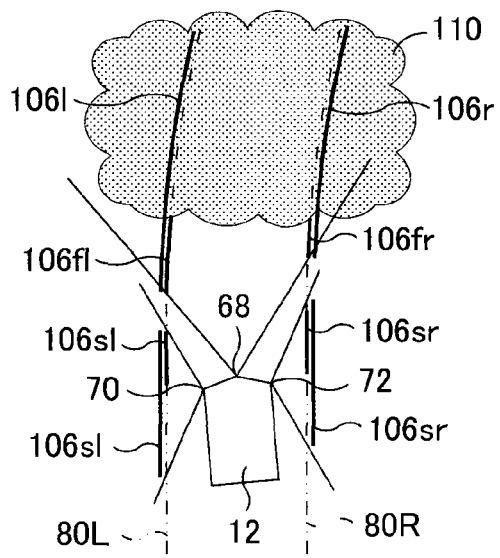
FIG. 20 is an explanatory illustration showing a manner where left and right white lines are supplemented with white lines having required length of Lsl and Lsr in the first embodiment.

FIG. 20 shows a situation where an obstacle 110 such as fog or the like is present in front of the vehicle which impedes capturing by the forward CCD camera 68, and only parts of the left and right white lines 106*l* and 106*r* to be captured can be captured by the forward CCD camera 68. In FIG. 20, 106*fl* and 106*fr* denote white lines which can be captured by the forward CCD camera 68, and 106*sl* and 106*sr* denote white lines which can be captured by the side CCD cameras 70 and 72.

The left and right side white lines are supplemented with white lines which have required length of Lsl and Lsr, respectively by the control in step 600. That is, the left and right side white lines are supplemented with white lines 106*sls* and 106*srs* having required length of Lsl and Lsr, respectively, not shown in the figure, which are parts of the white lines 106*l* and 106*r*. Therefore, even in a situation where an obstacle 110 is present which impedes capturing by the forward CCD camera 68, the travel track control can be continued without being terminated. It is to be noted that this effect can as well be achieved in the second to fourth embodiments described later.

In a situation where an obstacle 110 is present which impedes capturing by the forward CCD camera 68 and the alternative travel track control is required, if a negative decision is made in step 500, the travel track control is terminated without conducting step 600. Accordingly, when length of white lines specified on the basis of captured forward image information is smaller than the required length Lmin, the travel track control is terminated. Therefore, the travel track control can be prevented from being continued in a situation where supplementation of white lines with the captured information obtained by the side CCD cameras 70 and 72 cannot enable the travel track control to be properly continued. It is to be noted that this effect can as well be achieved in the second to fourth embodiments described later.

According to the first embodiment, in step 300, with respect to the lane specified on the basis of captured side image information, a curvature radius Rs of the lane, lateral difference Ds of the vehicle, yaw angle φs of the vehicle, a target lateral difference Dst of the vehicle and a target yaw angle φst of the vehicle are calculated and a target lateral acceleration Gyt is calculated on the basis of these values. Therefore, it is possible to run the vehicle more preferably along a lane while keeping attitude of the vehicle proper as compared to, for example, a case where a curvature radius Rs of a lane is not considered or a target lateral acceleration Gyt is calculated on the basis of lateral difference Ds of the vehicle and a target lateral difference Dst of the vehicle. It is to be noted that this effect can as well be achieved in the second embodiment described later.

Second Embodiment

Figure 10:
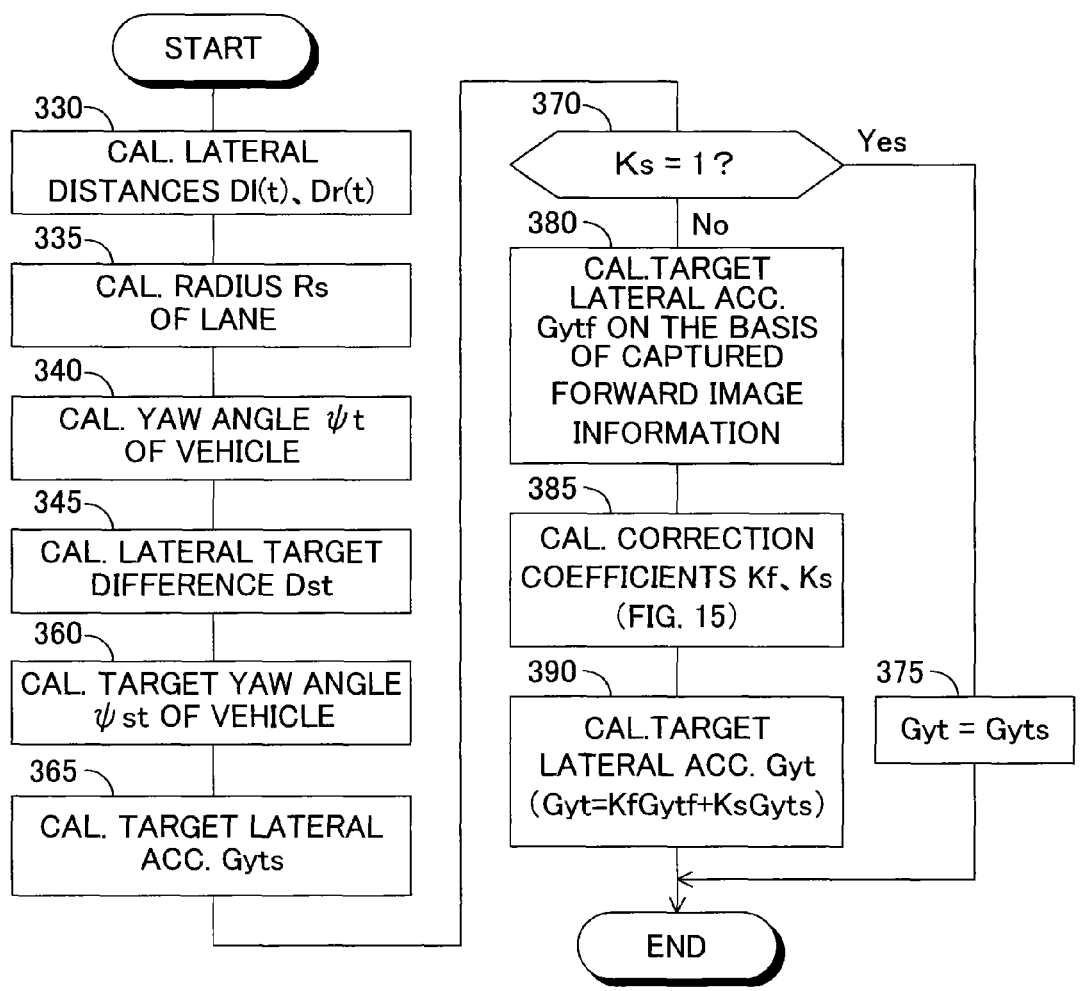
FIG. 10 is a flowchart showing a routine for calculating a target lateral acceleration Gyt based on captured side image information in a second embodiment.

FIG. 10 is a flowchart showing a routine for calculating a target lateral acceleration Gyt on the basis of captured side image information in the second embodiment of the vehicle travel track control device according to the present invention. In FIG. 10, the same steps as those shown in FIG. 6 are denoted by the same step numbers as in FIG. 6. The same goes to the following embodiments.

In the second embodiment, while steps 330 to 345 are conducted in manners different from those in the above-described first embodiment, steps 360 to 390 are conducted in the same manners as in the above-described first embodiment.

Figure 21:
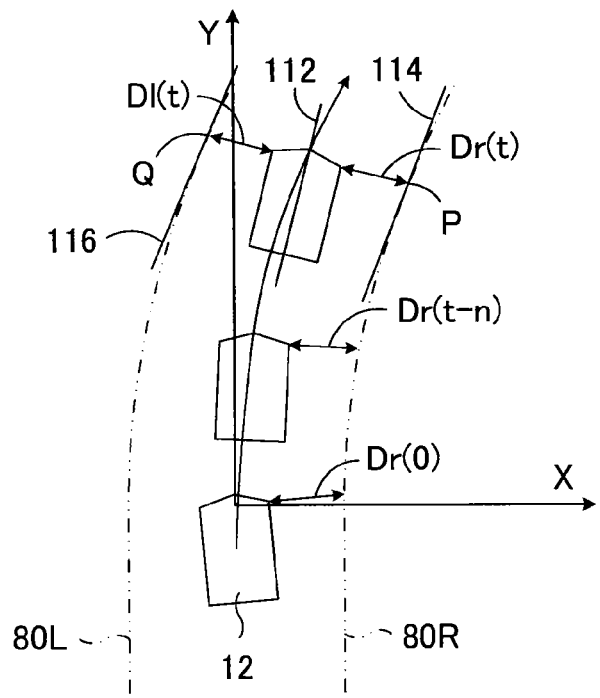
FIG. 21 is an explanatory illustration showing a manner for setting rectangular coordinates and calculating curvature radius of a lane in the second embodiment.

In particular, in step 330, as shown in FIG. 21, with respect to the present time t=t, are calculated a distance Dr(t) between the right edge at the front end of the vehicle and the right edge of a lane and a distance Dl(t) between the left edge at the front end of the vehicle and the left edge of the lane in lateral direction of the vehicle.

In step 335, with respect to succeeding three time points t=0, t−n, t (n is a constant) which come one after another, as shown in FIG. 21, coordinates of a point P in rectangular coordinates are calculated. The rectangular coordinates are set so that a front reference position of the vehicle is the origin, the lateral direction of the vehicle is set to X axis and the forward direction of the vehicle is set to Y axis when the vehicle starts running or the running state of the vehicle transfers from straight running to turning.

For example, with a slip angle of the vehicle being represented by β and coordinates of the front reference position of the vehicle (located at the center in width of the vehicle) at a time of starting calculations being represented by (X0, Y0), coordinates (Xt, Yt) of the front reference position of the vehicle at each time are calculated in accordance with the following Formulae 9 and 10. In addition, with an inclination angle of a longitudinal line 112 of the vehicle 12 in the rectangular coordinates at a time of starting calculations being represented by φin0, an inclination angle φint of a longitudinal line 112 of the vehicle 12 in the rectangular coordinates at the present time t=t is calculated in accordance with the following Formula 11.

$$Xt = X0 + V\smallint_0^t \cos(\beta + \phi s)dt \quad (9)$$

$$Yt = Y0 + V\smallint_0^t \sin(\beta + \phi s)dt \quad (10)$$

$$\phi int = \phi in0 + \smallint_0^t \gamma dt \quad (11)$$

It is to be understood that a slip angle β of the vehicle can be calculated as follows, for example. First, side slide acceleration of the vehicle body is calculated from the lateral acceleration Gy, vehicle speed V and yaw rate γ as Vyd=Gy−V*γ; the side slide acceleration Vyd thus obtained is integrated to obtain side slide velocity Vy of the vehicle body; then slip angle β of the vehicle body is calculated as a ratio Vy/Vx of the side slide velocity Vy to the longitudinal velocity Vx of the vehicle body (=vehicle speed V).

Next, as shown in FIG. 21, with respect to three time points which come one after another, coordinates of a point P on the right edge of a lane are calculated on the basis of the coordinates (Xt, Yt) of the front reference position of the vehicle (located at the center in width of the vehicle), the inclination angle φint and the distances Dr(0), Dr(t−n) and Dr(t) between the right edge at the front end of the vehicle and the point P.

Further, simultaneous equations are set by means of the values of the coordinates (Xp(0), Yp(0)), (Xp(t−n), Yp(t−n)) and (Xp(t), Yp(t)) of the point P at the three time points being substituted into the following Formula 12. A curvature radius Rs of the lane is calculated by solving the simultaneous equations.

$$(Xt-A)^2+(Yt-B)^2=Rs^2 \tag{12}$$

In step 340, a tangential line 114 is determined which passes the point P at the present time t=t that is on the right side white line 80R, and a yaw angle φt of the vehicle is calculated which is an angle formed by the longitudinal line 112 and the tangential line 114, i.e. the difference between the inclinations of the lines in the rectangular coordinate.

It is to be noted that with yaw angles of the vehicle at the three time points t=0, t−n, t being represented by φ(0), φ(t−n) and φ(t), the above-mentioned three coordinates (Xp(0), Yp(0)), (Xp(t−n), Yp(t−n)) and (Xp(t), Yp(t)) of the point P at the three time points t=0, t−n, t are expressed by the following Formulae 13 to 18.

$$Xp(0) = X0 + \frac{W + 2Dr(0)}{2}\cos\varphi(0) \tag{13}$$

$$Yp(0) = Y0 + \frac{W + 2Dr(0)}{2}\sin\varphi(0) \tag{14}$$

$$Xp(t-n) = Xt-n + \frac{W + 2Dr(t-n)}{2}\cos\varphi(t-n) \tag{15}$$

$$Yp(t-n) = Yt-n + \frac{W + 2Dr(t-n)}{2}\sin\varphi(t-n) \tag{16}$$

$$Xp(t) = Xt + \frac{W + 2Drt}{2}\cos\varphi(t) \tag{17}$$

$$Yp(t) = Yt + \frac{W + 2Drt}{2}\sin\varphi(t) \tag{18}$$

In step 345, with respect to the present time t=t, is calculated a distance Dl(t) between the left edge at the front end of the vehicle and the left edge of the lane in lateral direction of the vehicle. A target lateral difference Dst relative to the center of the lane is calculated on the basis of the yaw angle φt of the vehicle and the left and right lateral distances Dl(t) and Dr(t) in accordance with the following Formula 19.

$$Dst = \frac{Dr(t)\cos\varphi t + W/\cos\varphi t + Dl(t)\cos\varphi t - W}{2} \tag{19}$$

Thus, according to the second embodiment, even in a situation where the travel track control cannot properly be executed on the basis of captured forward image information, the control can be continued on the basis of captured side image information obtained by the side CCD camera 70 or 72.

In particular, according to the second embodiment, the lateral distances Dl(t) and Dr(t) can be lateral distances at only a front reference position of the vehicle and, accordingly, it is no need to obtain lateral distances at both front and rear reference positions of the vehicle.

In the above-described second embodiment, simultaneous equations are set by means of the values of the coordinates (Xp(0), Yp(0)), (Xp(t−n), Yp(t−n)) and (Xp(t), Yp(t)) of the point P at the three time points being substituted into the following Formula 12, and a curvature radius Rs of the lane is calculated by solving the simultaneous equations. However, a curvature radius Rs of the lane can be calculated on the basis of three coordinates of a point Q which is on the left side white line 80L. Alternatively, a curvature radius Rs of the lane can be calculated as a simple average value or a weighed average value of the curvature radius Rsr of the lane based on the above-mentioned three coordinates of the point P and a curvature radius Rsl of the lane based on three coordinates of the point Q.

In the above-described second embodiment, a tangential line 114 is determined which passes the point P that is on the right side white line 80R, and a yaw angle φt of the vehicle is calculated which is an angle formed by the longitudinal line 112 and the tangential line 114. However, a tangential line 116 may be determined which passes the point Q that is on the left side white line 80L, and a yaw angle φt of the vehicle may be calculated which is an angle formed by the longitudinal line 112 and the tangential line 116. A yaw angle φt of the vehicle may be calculated as a simple average value or a weighed average value of the yaw angle φtr of the vehicle based on the tangential line 114 and the yaw angle φtl of the vehicle based on the tangential line 116.

Third Embodiment

Figure 11:
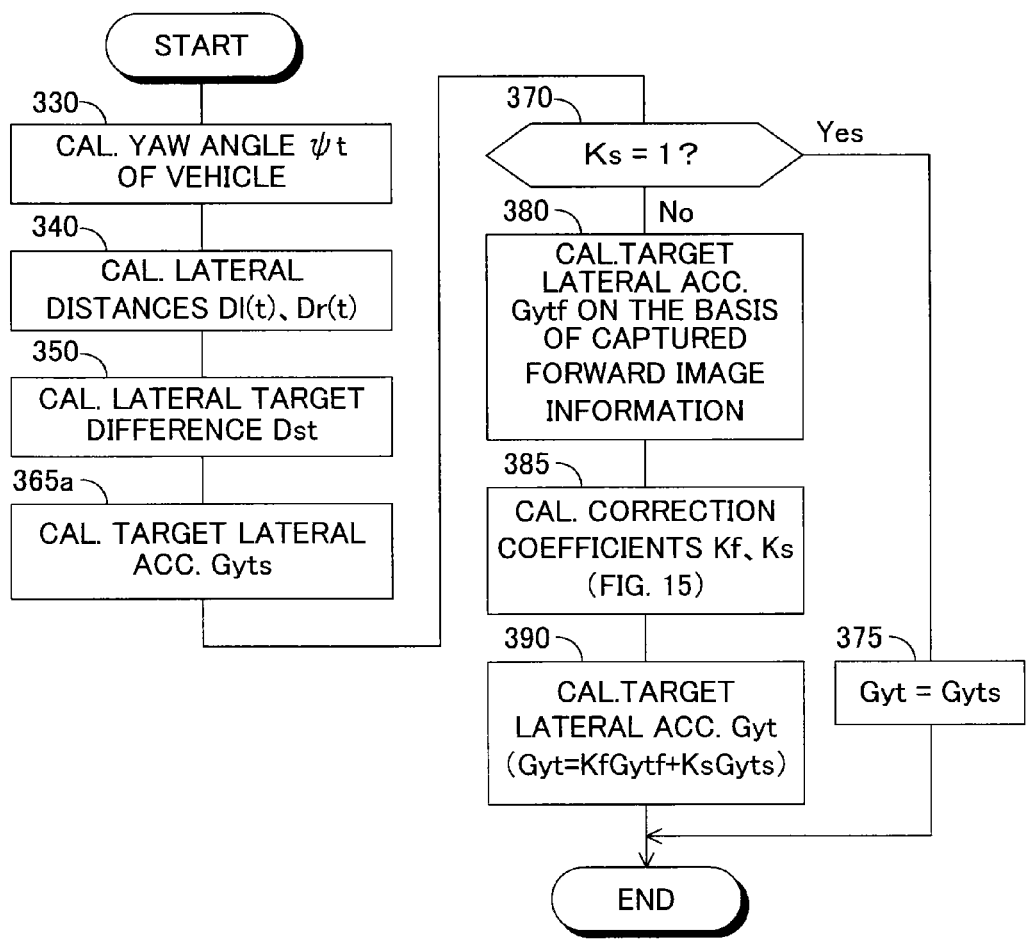
FIG. 11 is a flowchart showing a routine for calculating a target lateral acceleration Gyt based on captured side image information in a third embodiment.

FIG. 11 is a flowchart showing a routine for calculating a target lateral acceleration Gyt on the basis of captured side image information in the third embodiment of the vehicle travel track control device according to the present invention. In FIG. 11, the same steps as those shown in FIG. 10 are denoted by the same step numbers as in FIG. 10.

In the third embodiment, steps 330 to 340 are conducted in the same manners as in the above-described second embodiment, and steps 350 and 365a are conducted in stead of steps 345 and 365, respectively.

Figure 22:
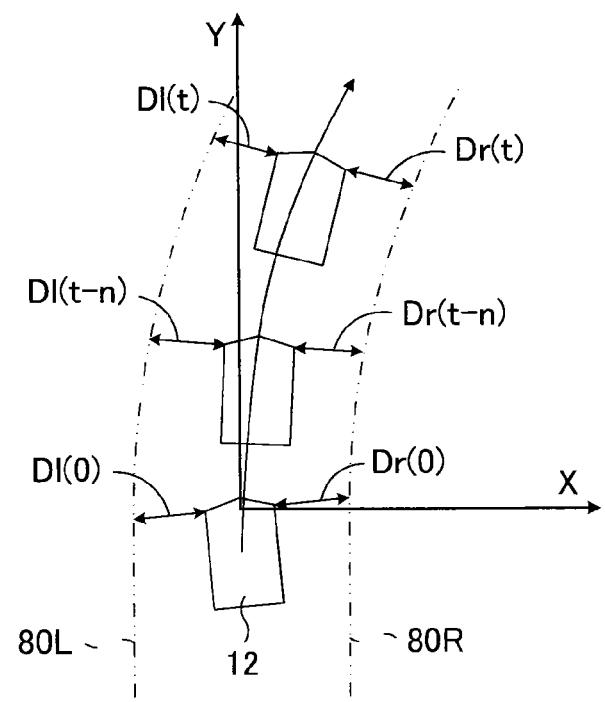
FIG. 22 is an explanatory illustration showing a manner for calculating distances between side edge at front end of the vehicle and left and right side edge of the lane in the third embodiment.
Figure 23:
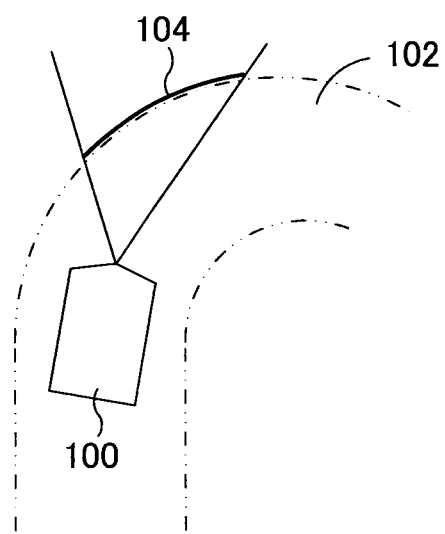
FIG. 23 is an explanatory illustration showing a situation where the vehicle travels along a lane having smaller curvature radius and the range for which a camera can capture an image is limited.

In step 350, as shown in FIG. 22, with respect to the present time t=t, is calculated a distance Dl(t) between the left edge at the front end of the vehicle and the left edge of the lane in lateral direction of the vehicle. Target lateral differences Drst and Dlst relative to the center of the lane are calculated on the basis of the yaw angle φt of the vehicle and the left and right lateral distances Dl(t) and Dr(t) in accordance with the same formulae as Formula 19. Further, a target lateral difference Dst relative to the center of the lane is calculated in accordance with the following Formula 20.

$$Dst=(Drst+Dlst)/2 \tag{20}$$

In step 365a, a target lateral acceleration Gyts of the vehicle on the basis of the captured side image information is calculated in accordance with the following Formula 21.

$$Gyts=Ksy(Dst-Dt) \tag{21}$$

Thus, according to the third embodiment, even in a situation where the travel track control cannot properly be executed on the basis of captured forward image information, the control can be continued on the basis of captured side image information without calculating curvature radius Rs of the lane.

In the above-described third embodiment, a target lateral acceleration Gyts of the vehicle is calculated without considering a yaw angle of the vehicle. However, as in the under-described fourth embodiment, a target lateral acceleration Gyts of the vehicle may be calculated in accordance with the under-mentioned Formula 24.

Fourth Embodiment

Figure 12:
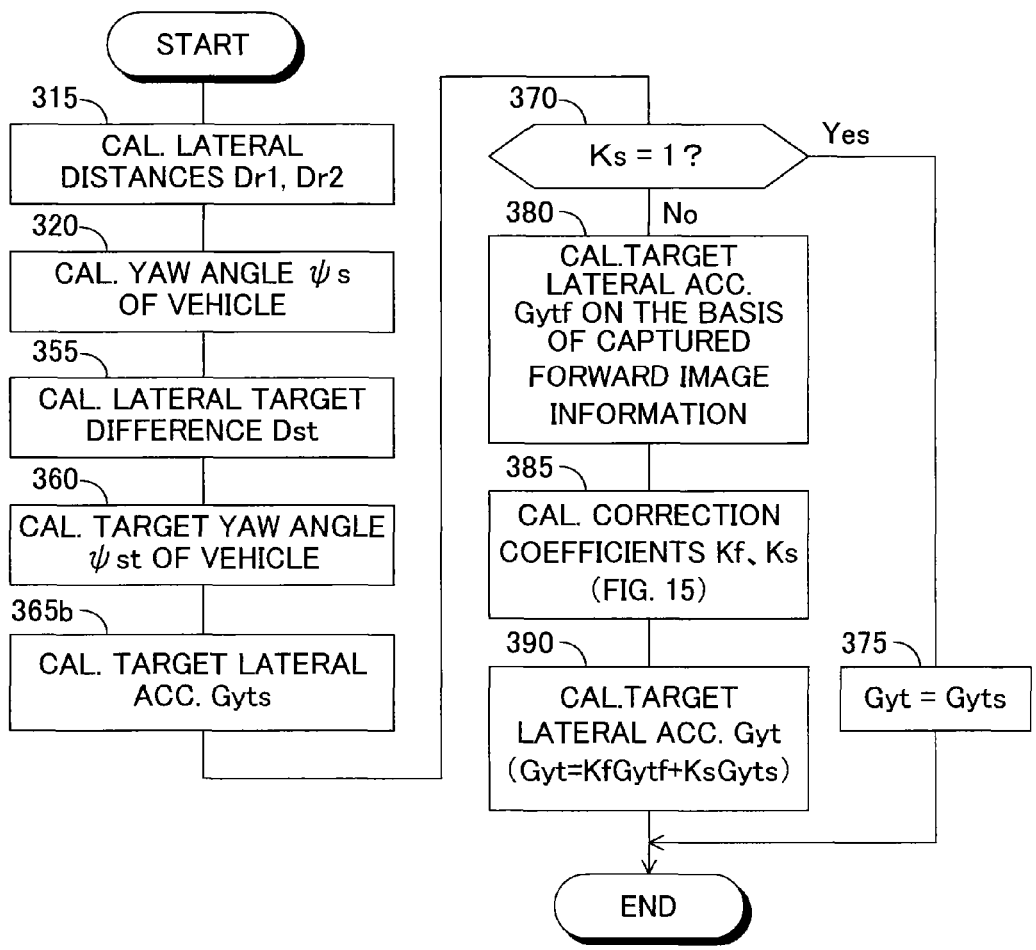
FIG. 12 is a flowchart showing a routine for calculating a target lateral acceleration Gyt based on captured side image information in a fourth embodiment.

FIG. 12 is a flowchart showing a routine for calculating a target lateral acceleration Gyt on the basis of captured side image information in the fourth embodiment of the vehicle travel track control device according to the present invention.

In the fourth embodiment, step 310 is not conducted, and steps 355 and 365*b* are conducted in stead of steps 325 and 365, respectively. Steps 360 and 370 to 390 are conducted in the same manners as in the above-described first embodiment.

In step 355, in a situation where the left side CCD camera 70 and the right side CCD camera 72 are utilized, a target lateral difference Dst relative to the center of the lane is calculated in accordance with the same formula as Formula 19 in the second embodiment. In a situation where only the right side CCD camera 72 is utilized, a target lateral difference Dst is calculated in accordance with the following Formula 23 in which $\Delta Xr$ is represented by the following Formula 22.

$$\Delta Xrt = Xr - Dr(t)\cos\varphi t - W/\cos\varphi t \qquad (22)$$

$$Dst = \frac{Dr(t)\cos\varphi t + W/\cos\varphi t + \Delta Xr - W}{2} \qquad (23)$$
$$= \frac{Xr - W}{2}$$

In step 365*b*, a target lateral acceleration Gyts of the vehicle on the basis of the captured side image information is calculated in accordance with the following Formula 24.

$$Gyts = Ksy(Dst - Dt) + Ksh(\phi st - \phi s) \qquad (24)$$

Thus, according to the fourth embodiment, as in the third embodiment, even in a situation where the travel track control cannot properly be executed on the basis of captured forward image information, the control can be continued on the basis of captured side image information without calculating curvature radius Rs of the lane.

In particular, according to the above-described fourth embodiment, since captured side image information may be either left or right side image information, even in a situation where one of the left side CCD camera 70 and the right side CCD camera 72 becomes unable to capture an image, the travel track control can be continued.

Fifth Embodiment

Figure 13:
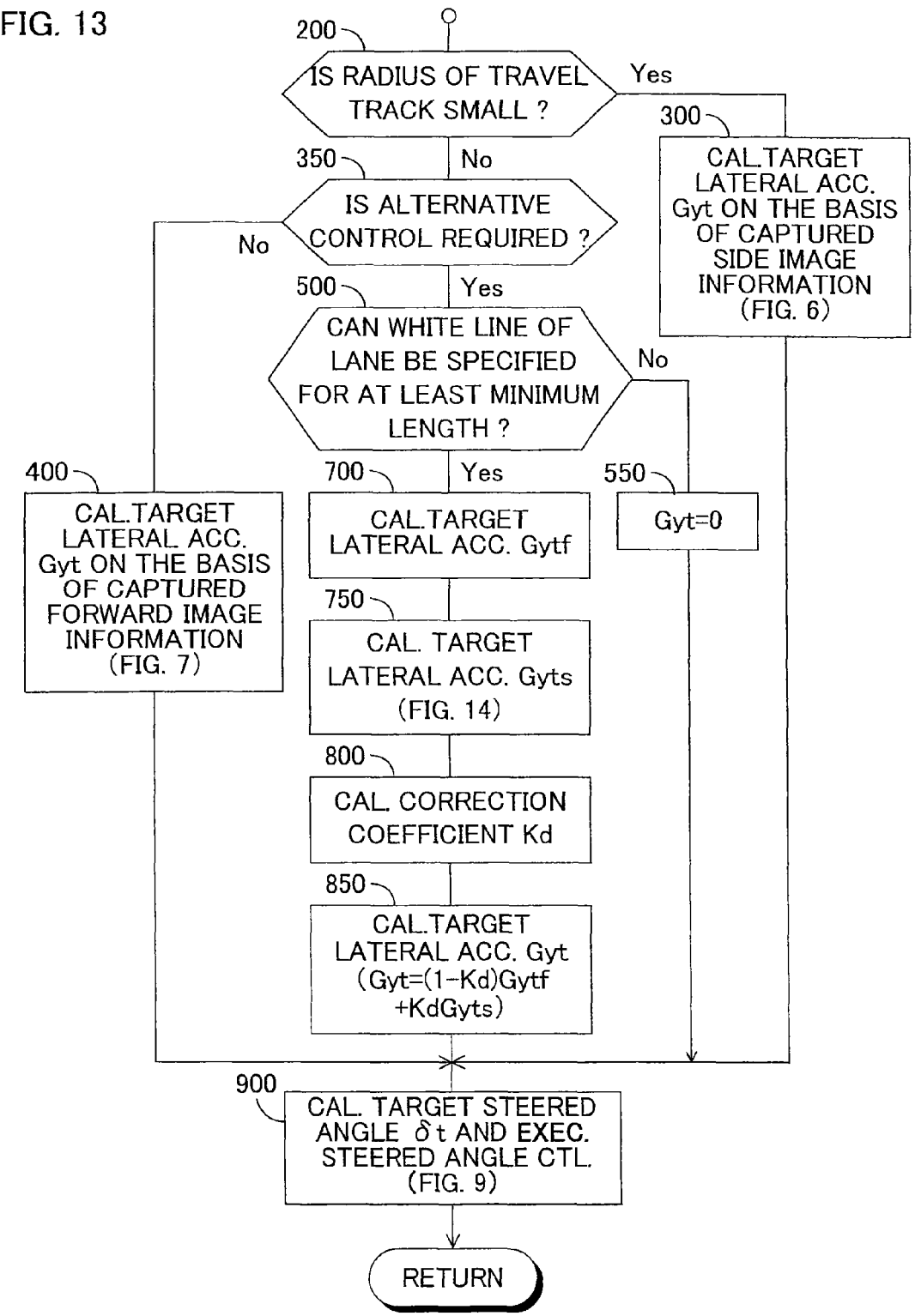
FIG. 13 is a flowchart showing an essential part of a main routine of a vehicle travel track control in a fifth embodiment.

FIG. 13 is a flowchart showing a routine for calculating a target lateral acceleration Gyt on the basis of captured side image information in the fifth embodiment of the vehicle travel track control device according to the present invention.

In the fifth embodiment, steps 100 to 550 are conducted in the same manners as in the above-described first embodiment, and if an affirmative decision is made in step 500, the control proceeds to step 700.

Figure 6:
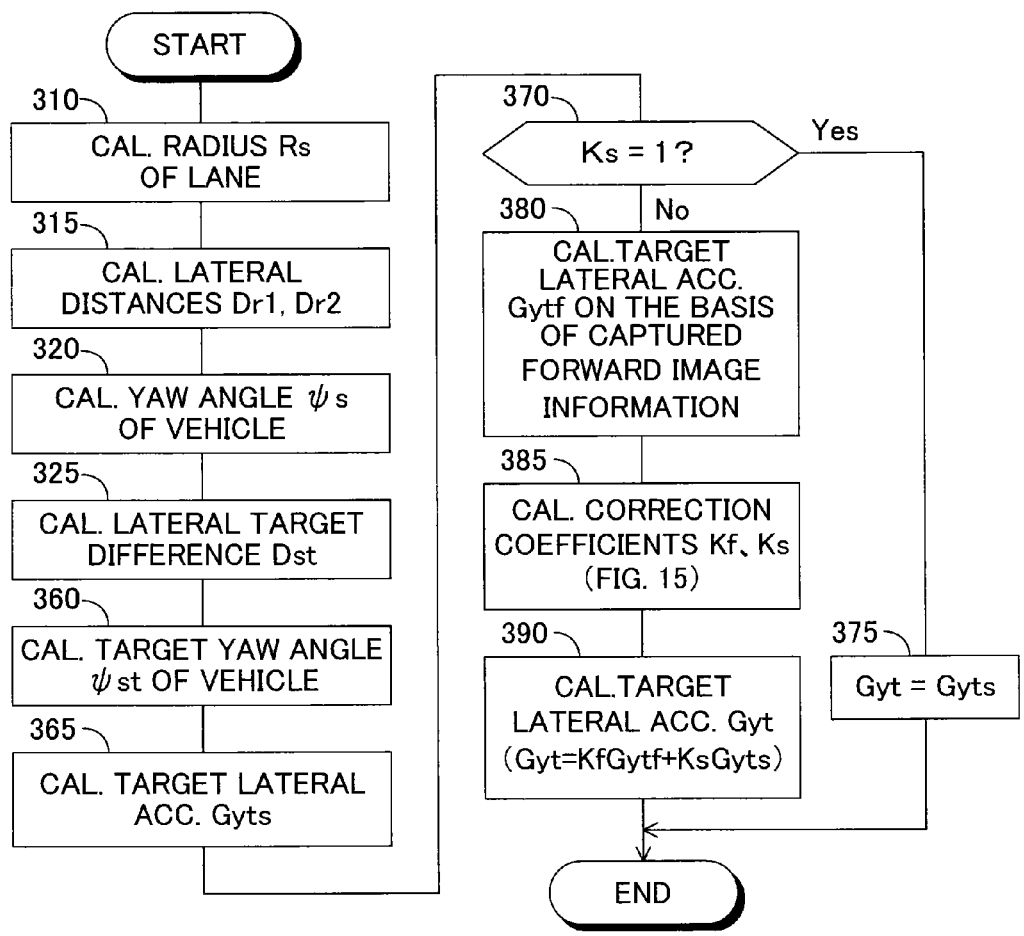
FIG. 6 is a flowchart showing a routine for calculating a target lateral acceleration Gyt based on captured side image information which is conducted in step 300 shown in FIG. 5.
Figure 7:
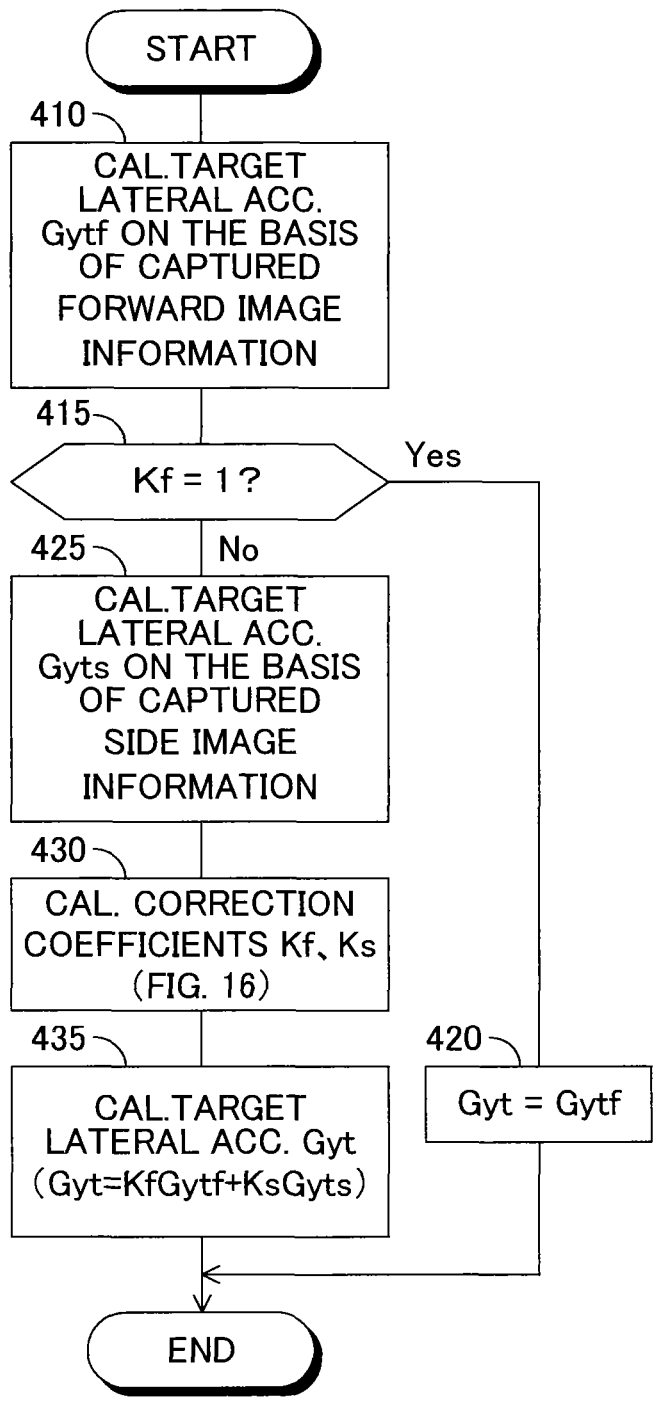
FIG. 7 is a flowchart showing a routine for calculating a target lateral acceleration Gyt based on captured front image information which is conducted in step 400 shown in FIG. 5.

In step 700, a target lateral acceleration Gytf of the vehicle is calculated on the basis of the captured forward image information as in step 380 in the flowchart shown in FIG. 6 and in step 410 in the flowchart shown in FIG. 7.

Figure 14:
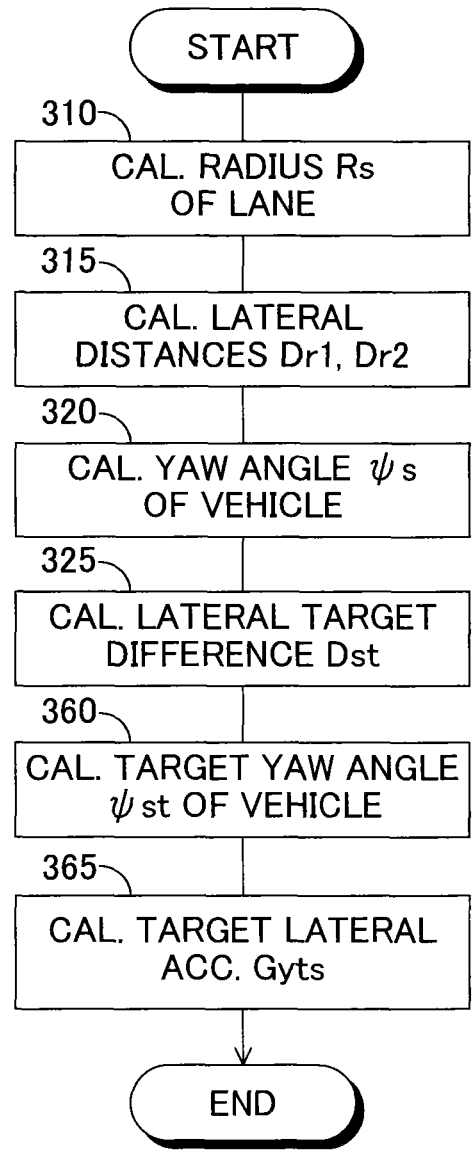
FIG. 14 is a flowchart showing a routine for calculating a target lateral acceleration Gyts based on captured side image information which is conducted in step 300 shown in FIG. 13.

In step 750, a target lateral acceleration Gyts of the vehicle is calculated on the basis of the captured side image information in accordance with the flowchart shown in FIG. 14. It is to be noted that steps 310 to 365 in the flowchart shown in FIG. 14 are the same as steps 310 to 365 in the flowchart shown in FIG. 6 for the first embodiment.

In step 800, a forward observing distance Lv of a driver is estimated on the basis of vehicle speed V, curvature radius Rs of the lane and inclination of the lane, and a length Lfd of the white line ahead of the vehicle which the forward CCD camera can recognize is determined. A correction coefficient Kd is calculated to be a value which is larger than 0 and smaller than 1 so that the coefficient increases as the length Lfd is shorter relative to the forward observing distance Lv and decreases as the length Lfd is longer relative to the forward observing distance Lv.

In step 850, a target lateral acceleration Gyt of the vehicle is calculated as a linear sum of the target lateral accelerations Gytf and Gyts based on the correction coefficient Kd in accordance with the following Formula 25.

$$Gyt = (1 - Kd)Gytf + KdGyts \qquad (25)$$

Thus, according to the fifth embodiment, even in a situation where the travel track control cannot properly be executed on the basis of captured forward image information, the control can be continued as long as it can be executed on the basis of captured forward and side image information.

In particular, according to the above-described fifth embodiment, in step 800, correction coefficient Kd is calculated, and target lateral acceleration Gyt of the vehicle is calculated as a linear sum of the target lateral accelerations Gytf and Gyts based on the correction coefficient Kd in accordance with the Formula 25. The correction coefficient Kd is variably calculated so that it increases as the length Lfd is shorter relative to the forward observing distance Lv and decreases as the length Lfd is longer relative to the forward observing distance Lv.

Accordingly, the travel track control can be continued by increasing a contribution degree of the captured forward image information in a situation where the length Lfd is longer relative to the front observing distance Lv and by increasing a contribution degree of the captured side image information in a situation where the length Lfd is shorter relative to the front observing distance Lv. Therefore, as compared with a case where the correction coefficient Kd is not variably set, the travel track control can appropriately be continued according to the magnitude correlation of the forward observing distance Lv and the length Lfd.

While the present invention has been described with reference to the above embodiments, it will be apparent to those skilled in the art that the present invention is not limited thereto, but may be embodied in various other forms without departing from the scope of the invention.

For example, in the above-described embodiments, the image capture means includes the forward CCD camera 68, the left side CCD camera 70 and the right side CCD camera 72. However, the image capture means may be a image capture device or two image capture devices which can vary at least one of capturing direction and capturing angle.

In the above-described embodiments, the front and rear reference positions are front and rear ends of a vehicle. However, at least one of the front and rear reference positions may be a position located between front and rear ends of a vehicle. Alternatively, the front reference position may be set to a position located forward of front end of a vehicle or the rear reference position may be set to a position located rearward of rear end of a vehicle.

In the above-described embodiments, if a negative decision is made in step 500, the control proceeds to step 550 and the travel track control is terminated. However, when a negative decision is made in step 500 in a situation where the vehicle is travelling at night or in foggy weather, projecting direction of front lights and/or fog lamps may be varied and the decision in step 500 may again be conducted.

While in the above-described first to third embodiments, the reference of target lateral difference of a vehicle is a center of a lane, it may be right or left side edge of a lane. Alternatively, the reference may be variably set according to turn direction of a lane so that it is set to a side edge on turn inner side, for example.

In the above-described first to fourth embodiments, steps 500 and 600 may be omitted.

The invention claimed is:

1. A vehicle travel track control device comprising:
an image capture device which captures a forward image ahead of a vehicle and captures at least one side image on at least one lateral side of the vehicle, the image capture device having at least one of a variable capturing direction and a variable capturing range; and
an electronic control unit which calculates a target steered angle of steered wheels based on captured image information sent from said image capture device and controls a steered angle of the steered wheels based on said target steered angle to control the vehicle to travel along a lane, wherein
in a first mode, the electronic control unit calculates the target steered angle of the steered wheels based on captured forward image information ahead of the vehicle, and
in a situation where the target steered angle of the steered wheels cannot properly be calculated based on the captured forward image information ahead of the vehicle, said electronic control unit changes to a second mode wherein said electronic control unit
controls said image capture device to capture a side image on a side of the vehicle,
determines a line of the lane based on captured side image information,
estimates lateral distances between the vehicle and the line of the lane at reference positions based on the captured side image information,
estimates a lateral difference and a yaw angle of the vehicle relative to the lane based on the lateral distances at the reference positions,
calculates a target lateral difference of the vehicle relative to the lane based on the lateral difference of the vehicle and the yaw angle of the vehicle, and
calculates a target steered angle of the steered wheels based on at least a difference between the lateral difference of the vehicle and the target lateral difference of the vehicle.

2. A vehicle travel track control device according to claim 1, wherein said electronic control unit
estimates a curvature radius of the lane based on the captured side image information,
calculates a target yaw angle of the vehicle relative to the lane based on the curvature radius of the lane, and
calculates the target steered angle of the steered wheels based on a difference between the lateral difference of the vehicle and the target lateral difference of the vehicle, a difference between the yaw angle of the vehicle and the target yaw angle of the vehicle, and the curvature radius of the lane.

3. A vehicle travel track control device according to claim 1, wherein said electronic control unit
estimates yaw angles of the vehicle with respect to three time points based on vehicle travel motion,
estimates positions of the vehicle in rectangular coordinates with respect to the three time points based on the yaw angles of the vehicle and vehicle travel motion,
estimates lateral differences of the vehicle relative to the lane at a reference position of the vehicle with respect to the three time points based on the captured side image information,
estimates a curvature radius of the lane based on the lateral difference of the vehicle relative to the lane, the yaw angle of the vehicle, and the position of the vehicle at the third time point,
calculates a target yaw angle of the vehicle based on the curvature radius of the lane, and
calculates a target steered angle of the steered wheels based on a difference between the lateral difference of the vehicle and the target lateral difference of the vehicle at the third time point, a difference between the yaw angle of the vehicle and the target yaw angle of the vehicle at the third time point, and the curvature radius of the lane.

4. A vehicle travel track control device according to claim 1, wherein said electronic control unit
estimates a lateral difference of the vehicle relative to the lane at a reference position of the vehicle based on the captured side image information,
calculates a target lateral difference of the vehicle relative to the lane based on at least one of the lateral difference of the vehicle and width information of the lane, and
calculates a target steered angle of the steered wheels based on the lateral difference of the vehicle and the target lateral difference of the vehicle.

5. A vehicle travel track control device according to claim 4, wherein said image capture device includes
a left side image capture device which captures a left side image on the left side of the vehicle and
a right side image capture device which captures a right side image on the right side of the vehicle; and
said electronic control unit
estimates lateral differences of the vehicle relative to edges of the lane on the left and right sides of the vehicle based on captured left and right side image information, and
calculates a target lateral difference of the vehicle relative to the lane based on lateral differences of the vehicle relative to edges of the lane on the left and right sides of the vehicle.

6. A vehicle travel track control device according to claim 1, wherein
said electronic control unit
estimates lateral differences of the vehicle relative to the lane at front and rear reference positions spaced apart from each other longitudinally of the vehicle based on the captured side image information,
estimates the yaw angle of the vehicle relative to the lane based on the lateral differences of the vehicle relative to the lane at the front and rear reference positions,
calculates a curvature radius of the lane based on the lateral differences of the vehicle,
calculates a target yaw angle of the vehicle based on the curvature radius of the lane, and,
with a target lateral difference of the vehicle being one of a value variably set based on width of the lane and a predetermined value,
calculates
a target steered angle of the steered wheels based on a difference between the lateral difference of the vehicle and the target lateral difference of the vehicle and
a difference between the yaw angle of the vehicle and the target yaw angle of the vehicle.

7. A vehicle travel track control device according to claim 1, wherein
said image capture device includes a forward image capture device which captures the forward image ahead of the vehicle and a side image capture device which captures the side image on at least one of the left and right sides of the vehicle; and said electronic control unit calculates a target steered angle of the steered wheels based on captured forward image information from said forward image capture device in a situation where a target steered angle of the steered wheels can properly be calculated based on the captured forward image information ahead of the vehicle and calculates a target steered angle of the steered wheels based on at least the captured side image information from said side image capture device in the situation where a target steered angle of the steered wheels cannot properly be calculated based on the captured forward image information ahead of the vehicle.

8. A vehicle travel track control device according to claim 1, wherein said electronic control unit calculates the target steered angle of the steered wheels based on the captured forward image information sent from said forward image capture device in a situation where the curvature radius of vehicle travel track is larger than a reference value, and calculates the target steered angle of the steered wheels based on the captured side image information sent from said side image capture device in a situation where the curvature radius of vehicle travel track is not larger than said reference value.

9. A vehicle travel track control device according to claim 8, wherein in a situation where the curvature radius of vehicle travel track is not larger than said reference value, said electronic control unit calculates a first target steered angle of the steered wheels based on the captured forward image information sent from said forward image capture device and calculates a second target steered angle of the steered wheels based on the captured side image information sent from said side image capture device, estimates a forward observing distance of a driver based on a vehicle speed and the curvature radius of vehicle travel track, variably sets a contribution degree of the second target steered angle so that the degree becomes high when an image-capturable distance of said forward image capture device is shorter relative to the forward observing distance as compared to a case where the image-capturable distance of said forward image capture device is long relative to the forward observing distance, and calculates a target steered angle of the steered wheels based on the first target steered angle, the second target steered angle, and the contribution degree.

10. A vehicle travel track control device according to claim 1, wherein said electronic control unit gradually changes the target steered angle of the steered wheels when vehicle travel track control is interchanged between the first mode where the target steered angle of the steered wheels is calculated based on the captured forward image information and the second mode where the target steered angle of the steered wheels is calculated based on at least the captured side image information.

11. A vehicle travel track control device according to claim 1, wherein said electronic control unit decreases vehicle speed to continue the control of vehicle travel track in at least one of a case where there is a risk for the vehicle to escape from the lane and a case where the performance of said image capture means deteriorates in image capture accuracy.

12. A vehicle travel track control device according to claim 1, wherein the situation where the target steered angle of the steered wheels cannot properly be calculated based on captured forward image information ahead of the vehicle arises when the electronic control unit determines that a length of at least one forward lane line is not at least a predetermined minimum length required to be specified to execute a travel track control of the vehicle.

13. A vehicle travel track control device according to claim 1, wherein a situation where the target steered angle of the steered wheels can properly be calculated based on the captured forward image information ahead of the vehicle arises when the electronic control unit determines that a length of at least one forward lane line is at least a predetermined minimum length required to be specified to execute a travel track control of the vehicle.

14. A vehicle travel track control device according to claim 1, wherein the electronic control unit estimates the lateral distances between the vehicle and the line of the lane based at reference positions based on the captured side image information according to the following formula:

$$D = \frac{DcH}{Hc}$$

wherein

D is a lateral distance between the vehicle and the line of the lane,

Dc is a distance between a lens and an image capturing plane of the image capture device, H is a height of the image capture device from a road lane, and Hc is a distance between a light axis of the image capture device and an image of the line of the lane at the image capturing plane of the image capture device.

15. A vehicle travel track control device according to claim 1, wherein the electronic control unit estimates the yaw angle of the vehicle relative to the lane according to the following formula:

$$\varphi s = \tan^{-1}\left(\frac{D1 - D2}{L}\right)$$

wherein

φs is the yaw angle of the vehicle relative to the lane,

D1 is a lateral distance between the vehicle and the line of the lane at a first reference position, D2 is a lateral distance between the vehicle and the line of the lane at a second reference position, and L is a distance between the first and second reference positions.

* * * * *